US 8,582,177 B2

(12) United States Patent
Nitta

(10) Patent No.: US 8,582,177 B2
(45) Date of Patent: Nov. 12, 2013

(54) IMAGE FORMING APPARATUS AND DISPLAY METHOD THEREOF

(75) Inventor: Ryuichi Nitta, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 433 days.

(21) Appl. No.: 13/078,247

(22) Filed: Apr. 1, 2011

(65) Prior Publication Data

US 2011/0242561 A1 Oct. 6, 2011

(30) Foreign Application Priority Data

Apr. 2, 2010 (JP) .................................. 2010-086303

(51) Int. Cl.
*G06F 15/00* (2006.01)
(52) U.S. Cl.
USPC ............ 358/1.9; 358/1.13; 358/1.14; 399/81; 715/274; 715/705
(58) Field of Classification Search
USPC ......... 358/1.1, 1.9, 1.13, 1.14, 1.15; 345/172, 345/173; 399/81; 718/105; 715/273, 274, 715/705
See application file for complete search history.

(56) References Cited

U.S. PATENT DOCUMENTS

| 7,408,658 | B2 * | 8/2008 | Twede | 358/1.15 |
| 7,576,877 | B2 * | 8/2009 | Tanaka et al. | 358/1.14 |
| 7,911,626 | B2 * | 3/2011 | Ferlitsch | 358/1.13 |
| 8,368,932 | B2 * | 2/2013 | Inui | 358/1.15 |
| 2008/0180703 | A1 * | 7/2008 | Yamada | 358/1.9 |
| 2009/0260017 | A1 * | 10/2009 | Yoshida | 718/105 |
| 2011/0242561 | A1 * | 10/2011 | Nitta | 358/1.9 |

FOREIGN PATENT DOCUMENTS

JP 2005-234645 9/2005

* cited by examiner

*Primary Examiner* — Kimberly A Williams
(74) *Attorney, Agent, or Firm* — Smith, Gambrell & Russell, LLP

(57) ABSTRACT

An image forming apparatus 100 includes: an image forming part 6, a liquid crystal display part 11, a storage device 92 storing a program for displaying a setting screen at the liquid crystal display part 11; an input part 1 receiving, for example, a setting made for a setting item; and a help key KH for displaying a help screen at the display part. When the help key KH has been pressed in the setting by the called program, the display part 11, before processing is performed for a referenced setting item as the setting item for which the help screen has been referenced, displays a confirmation screen for confirming whether or not the processing may be performed at the current setting for the referenced setting item.

20 Claims, 18 Drawing Sheets

(b)

ific Application No. 2010-086303 filed on Apr. 2, 2010, the contents of which are hereby incorporated by reference.

IMAGE FORMING APPARATUS AND DISPLAY METHOD THEREOF

This application is based on Japanese Patent Application No. 2010-086303 filed on Apr. 2, 2010, the contents of which are hereby incorporated by reference.

BACKGROUND OF THE INVENTION

1. Field of the Invention

The present invention relates to an image forming apparatus such as a copier, an MFP, a printer, or a fax machine that has an input part including a display part, a touch panel, etc.

2. Description of Related Art

An image forming apparatus such as a copier, an MFP, or the like may be provided with, for example, a liquid crystal display part and a touch panel so that functions (for example, zooming out/in, integrated printing, double-sided printing, image data transmission, etc.) to be set can easily be selected and set. However, with a trend towards a larger number of functions to be loaded in the image forming apparatus, the image forming apparatus has a wide variety of loaded functions, which makes it difficult in some cases to recognize not only methods of setting the functions but also detailed contents of the functions (what functions can be implemented). Thus, known is, for example, an electronic device that displays at the display part a screen (help screen) indicating, for example, the setting method.

Specifically, the electronic device includes: a display part that displays, for example, display elements corresponding to the respective functions; a storage part that stores help guide information; an operation part that receives predetermined operations by the user; and a control part that in response to the predetermined first operation, reads the help guide information from the storage part and in response to the predetermined second operation while the help information is displayed, selects and sets the function corresponding to the help guide information. With this configuration, the electronic device can, for the function desired by the user, select and set the corresponding function directly from a state in which the help guide information is displayed.

Typically, the image forming apparatus may be adapted to preselect a plurality of functions (setting items) often combined together for use and then preregister them as a program. Then in some cases, the registered program (called "work flow" in some cases) can be called to thereby make settings for the preselected plurality of setting items in series in a collective manner.

There are a case where the user is not familiar with the settings themselves since the image forming apparatus has been just introduced and a case where the user may not fully know detailed contents of the setting items included in the work flow since the user uses the work flow created by a different person. Thus, a possible solution is that even in the settings made by use of the work flow, a help screen is displayed by, for example, pressing a help key. Consequently, the user can make settings for the series of setting items included in the work flow while referring to the help screen.

However, especially for the setting item for which the help screen has been referenced, it is possible that a setting different from what the user assumed may be made. In other words, there arises a problem of high possibility of a setting error. Then job execution with the setting left different from what the user assumed brings about a problem that the job may result in vain.

Here, the electronic device can directly set the function from the state in which a help is displayed, and thus does provide great convenience. However, upon the job execution, the electronic device does not make confirmation with the user for the setting of the function for which the help screen has been referenced. Thus, the job may be executed with the setting error present, so that the electronic device cannot solve the problem described above.

SUMMARY OF THE INVENTION

Thus, it is an object of the present invention to have a user confirm, upon job execution, setting contents of a setting item referenced by displaying a help screen to eliminate a setting error that the setting is different from what the user assumed, thereby avoiding the job execution with the setting error present.

In order to achieve the object described above, an image forming apparatus according to the invention includes: an image forming part forming an image; a display part making a display; a storage part storing a program being a combination of setting items preselected from among setting items of a plurality of functions and preregistered, the program being called to thereby display at the display part a setting screen for making a setting for the preselected and preregistered setting item; an input part receiving the setting made for the setting item and instructions for starting a job; and a help key to be pressed for displaying at the display part a help screen for the setting for the setting item. When the help key has been pressed in the setting by the called program, the display part, after the instructions for starting a job are given to the input part, before processing is performed for a referenced setting item as the setting item for which the help screen has been referenced, displays a confirmation screen for confirming whether or not the processing may be performed at the current setting for the referenced setting item.

With this configuration, upon the job execution, the user can confirm the setting details of the referenced setting item. Therefore, the user can confirm whether or not there is any setting error. Moreover, an error that the job is performed with the setting error present can be eliminated.

Further features and advantages of the invention will be more clarified by embodiments described below.

DETAILED DESCRIPTION OF PREFERRED EMBODIMENTS

Hereinafter, a first embodiment of the present invention will be described with reference to FIGS. 1 to 15. This embodiment will be described, referring to an MFP 100 (corresponds to an image forming apparatus) as an example. Note that elements including configuration, arrangement, etc. described in this embodiment do not limit the scope of the invention and just serve as illustrative examples.

(Outline of Image Forming Apparatus)

Figure 1:
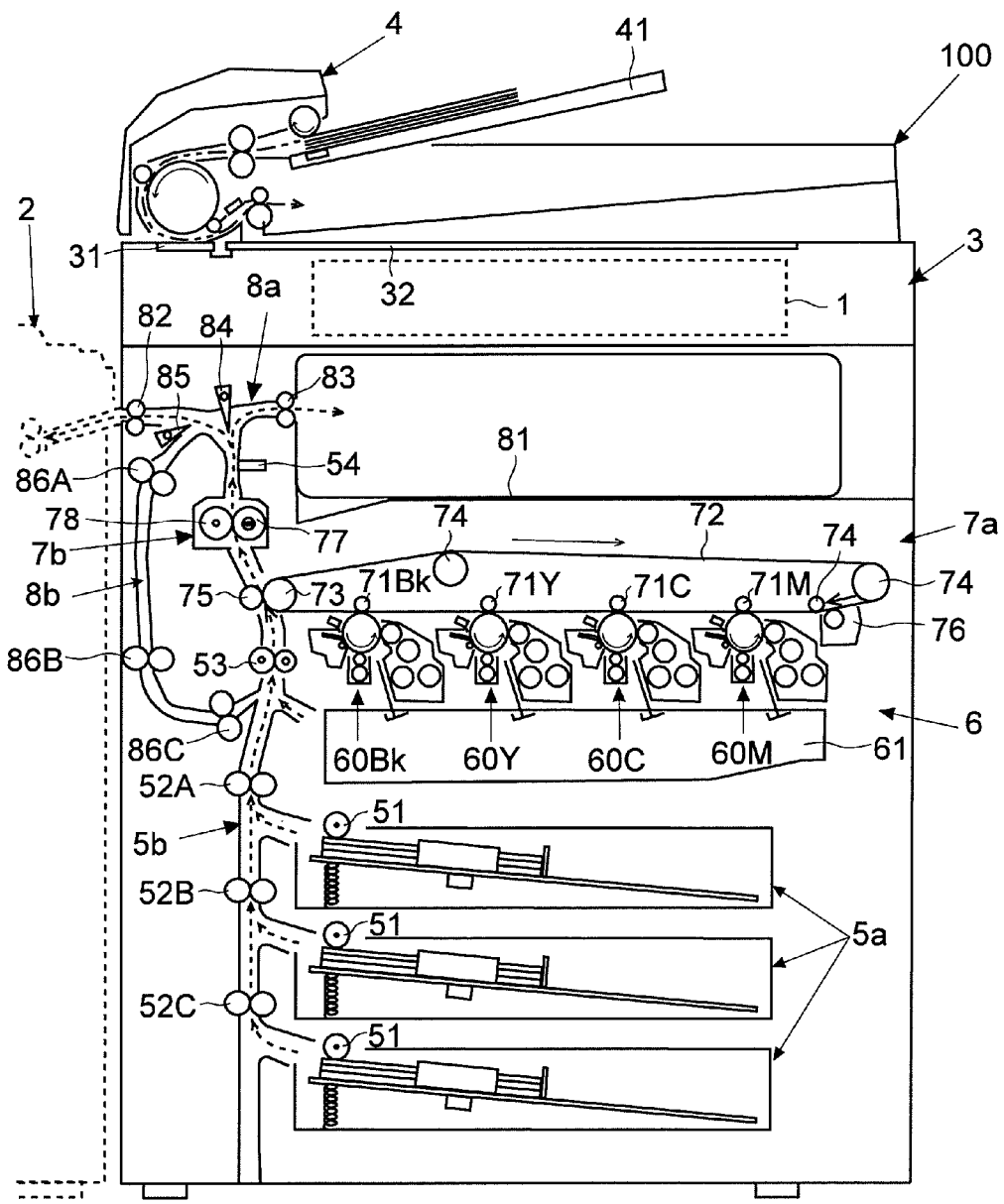
FIG. 1 is an elevation pattern cross section showing one example of an MFP according to a first embodiment of the present invention.
Figure 2:
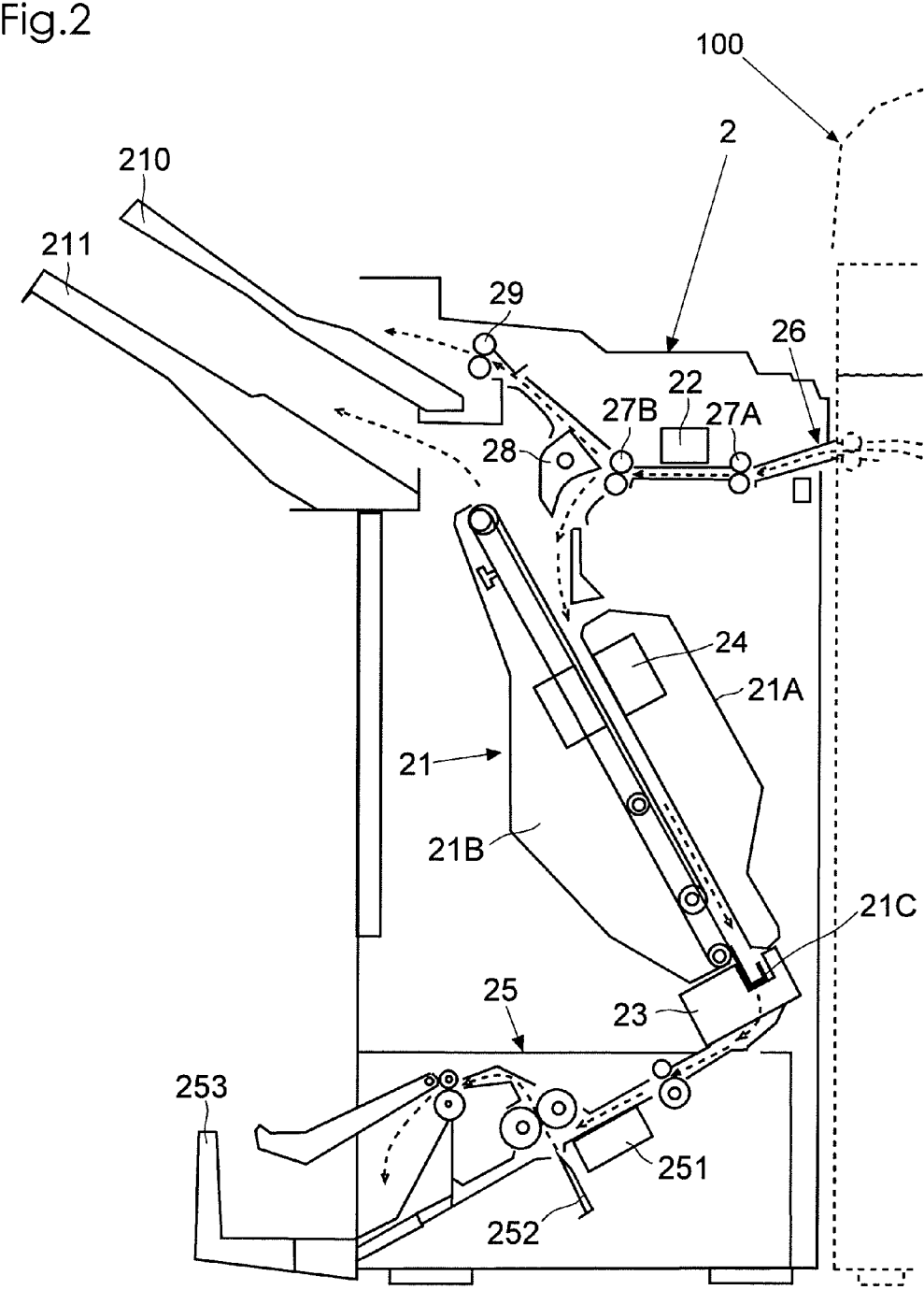
FIG. 2 is an elevation pattern cross section showing one example of a post-processing device according to the first embodiment.

First, an outline of the MFP 100 according to the first embodiment of the invention will be described with reference to FIG. 1. FIG. 1 is an elevation pattern cross section showing one example of the MFP 100 according to the first embodiment of the invention. FIG. 2 is an elevation pattern cross section showing one example of a post-processing device 2 according to the first embodiment of the invention. As shown in FIG. 2, the MFP 100 (corresponding to the image forming apparatus) of this embodiment includes the post-processing device 2 as an optional device fitted to a left side surface of the MFP 100. The post-processing device 2 takes in paper printed by the MFP 100, and performs various kinds of processing such as stapling. Also provided at the front in elevation view is an operation panel 1 for making various settings related to the MFP 100 (details of which will be described below).

As shown in FIG. 1, the MFP 100 of this embodiment has an image reading part 3 and a document conveying device 4 provided at the top of the MFP 100. The MFP 100 includes inside a main body thereof: paper feed parts 5a; a conveying path 5b; an image forming part 6; an intermediate transfer part 7a; a fixing part 7b; a discharge and conveying path 8a; a double-sided conveying path 8b; etc.

The document conveying device 4 has a document tray 41 where documents to be read are loaded. The document conveying device 4 automatically and consecutively conveys the documents one by one from the document tray 41 to a reading position (fed-document reading contact glass 31). The document conveying device 4 is fitted to the image reading part 3 in such a manner as to be openable and closable vertically with a far side of a paper surface of FIG. 1 as a support point, and functions as a cover that presses contact glasses (the fed-document reading contact glass 31 and a loaded-document reading contact glass 32) of the image reading part 3 from above.

Next, as shown in FIG. 1, arranged at the top of the image reading part 3 are: the fed-document reading contact glass 31; and the loaded-document reading contact glass 32 where documents such as a book are loaded to be read one by one. Arranged inside of the image reading part 3 are: a lamp, a mirror, a lens, an image sensor, etc. (not shown). The image sensor, based on light reflected on a document passing through the fed-document reading contact glass 31 or a document loaded on the loaded-document reading contact glass 32, reads the document. Then the image sensor converts the reflected light into an analog electrical signal in accordance with image density and then performs quantization, thereby obtaining image data of the document. Note that the image reading part 3 of this embodiment can read both a color image and a black-and-white image.

The plurality of paper feed parts 5a in the main body of the MFP 100 respectively store a plurality of pieces of various kinds of paper (for example, copy paper, recycled paper, a cardboard, an OHP sheet, etc.) of different sizes (for example, A-type paper and B-type paper such as A4, B4, etc.). Each of the paper feed parts 5a includes a paper feed roller 51 driven into rotation and delivers the paper one by one to the conveying path 5b upon printing.

The conveying path 5b is a path for conveying the paper from the paper feed parts 5a to the image forming part 6 in the apparatus. Provided at the conveying path 5b are: a guide plate for paper guidance; conveying roller pairs 52 (a total of three including 52A, 52B, and 52C from the top in FIG. 1) driven into rotation upon the paper conveyance; a registration roller pair 53 that puts the paper to be conveyed on standby before the image forming part 6 and then delivers the paper in synchronization with transfer of a formed toner image; etc.

The image forming part 6 includes: a plurality of image forming units 60 (60Bk for black, 60Y for yellow, 60C for cyan, and 60M for magenta) and an exposure device 61. The exposure device 61, based on, for example, the image data read at the image reading part 3, image data stored in a storage device 92 to be described below, outputs laser light while turning it on and off to thereby subject each of photoconductive drums to scanning exposure. Each image forming unit 60 is provided with: the photoconductive drum supported in such a manner as to be capable of being driven into rotation; and a charging device, a developing device; a cleaning device, etc. which are disposed around the photoconductive drum. By each image forming unit 60 and the exposure device 61, a toner image is formed onto a circumferential surface of the corresponding photoconductive drum.

The intermediate transfer part 7a, in response to primary transfer of the toner image from each image forming unit 60, performs secondary transfer on a sheet. The intermediate transfer part 7a is composed of: primary transfer rollers 71Bk to 71M; an intermediate transfer belt 72; a driving roller 73; a plurality of driven rollers 74; a secondary transfer roller 75; a belt cleaning device 76; etc. Each of the primary transfer rollers 71Bk to 71M sandwich the endless intermediate transfer belt 72 with the corresponding photoconductive drum. To each of the primary transfer rollers 71Bk to 71M, a transfer voltage is applied, whereby the toner images are transferred onto the intermediate transfer belt 72.

The intermediate transfer belt 72 is stretched over the driving roller 73, etc., and rounds by rotational driving of the driving roller 73 connected to a driving mechanism such as a motor (not shown). The driving roller 73 sandwiches the intermediate transfer belt 72 with the secondary transfer roller 75. The toner images (of the different colors including black, yellow, cyan, and magenta) respectively formed at the image forming units 60 are primarily transferred onto the intermediate transfer belt 72 in sequence while superposed on one another without any displacement and then transferred onto the sheet by the secondary transfer roller 75 to which a predetermined voltage has been applied.

The fixing part 7*b* fixes the toner images transferred onto the paper. The fixing part 7*b* is mainly composed of: a heating roller 77 having a built-in heat generator; and a pressure roller 78 making pressure-contact therewith. Upon passage of the paper through a nip between the heating roller 77 and the pressure roller 78, a toner melts and is heated, whereby the toner images are fixed onto the paper. The paper discharged from the fixing part 7*b* is delivered towards a discharge tray 81 or the post-processing device 2.

The discharge and conveying path 8*a* sorts conveyance directions of printed paper (direction towards the post-processing device 2, direction towards the discharge tray 81, and direction towards the double-sided conveying path 8*b*). The discharge and conveying path 8*a* has: a discharge roller pair 82 that delivers the paper towards the post-processing device 2; and a discharge roller pair 83 that delivers the paper towards the discharge tray 81 or that inversely rotates and switches back for double-sided printing. Each of the discharge roller pairs 82 and 83 is driven into rotation. Moreover, the discharge and conveying path 8*a* has, for example, two selector valves 84 and 85 for switching the paper conveyance direction. Each of the selector valves 84 and 85 pivots, guiding the paper (補足しました) to a discharge destination specified on the operation panel 1 or the like or guiding the paper already subjected to one-sided printing to the double-sided conveying path 8*b* upon double-sided printing.

The double-sided conveying path 8*b* links a downstream side of the fixing part 7*b* and an upstream side of the registration roller pair 53. The double-sided conveying path 8*b* is provided with, for the purpose of double-sided printing, a plurality of double-sided conveying roller pairs 86 (a total of three including 86A, 86B, and 86C) which are driven into rotation to convey the paper already subjected to one-sided printing.

On the other hand, as shown in FIG. 2, included in the post-processing device 2 are: a stacking part 21 that temporarily stores a bundle of paper; a punching part 22 that performs punching processing; a stapling part 23 that performs stapling processing (stapling of a paper leading end side as viewed from a stacking direction) on the bundle of paper in the stacking part 21; a stapling part 24 (that staples a paper rear end side); and a center folding unit 25. The stacking part 21 performs processing of stacking a plurality of pieces of paper to bundle them. The center folding unit 25 includes a center-binding stapling part 251, and bends along staples at the center the bundle of paper center-bound by processing performed by the center-binding stapling part 251.

The processing performed at the post-processing device 2 will be described in detail. First, the printed paper discharged from the MFP 100 towards the post-processing device 2 is carried in the post-processing device 2 through a carry-in port 26 provided on a side surface of the post-processing device 2. Provided downstream of the carry-in port 26 is the punching part 22. The punching part 22 performs the punching processing on the paper. Then provided downstream of the punching part 22 are: conveying roller pairs 27A and 27B that are driven into rotation to convey the paper; and a guide claw 28 that pivots in accordance with a paper conveyance destination. In a case where performing, for example, the stapling processing has been selected through inputting on the operation panel 1 or otherwise, the guide claw 28 pivots in such a manner as to deliver the paper to the stacking part 21 located below the guide claw 28. As a result, the paper is conveyed towards the stacking part 21.

On the other hand, in a case where performing, for example, the punching processing or the stapling processing has not been selected (in a case where no processing is to be performed at the post-processing device 2) or a case where the discharge destination is set at a secondary discharge tray 210 on the operation panel 1, the guide claw 28, for example, pivots in such a manner as to deliver the paper to a discharge roller pair 29 located above the guide claw 28. As a result, the paper is discharged from the discharge roller pair 29 to the secondary discharge tray 210.

The stacking part 21 is composed of a covering tray 21A and a stacking tray 21B. The conveyed paper is passed through between the covering tray 21A and the stacking tray 21B. The paper is stacked onto a top surface of the stacking tray 21B. The covering tray 21A functions as a cover that presses the bundle of paper from above. The stacking tray 21B is provided with a stopper 21C that receives the conveyed paper. The stopper 21C vertically moves to convey the stacked bundle of paper upward or downward.

Attached to the stacking part 21 are: the stapling part 23 that staples the paper leading end side (a lower side of the stacked paper); and the stapling part 24 that staples the paper rear end side (an upper side of the stacked paper). Each of the stapling parts 23 and 24 performs, for example, oblique binding of binding one area, i.e., one corner of the leading end of the bundle of paper obliquely at 45 degrees. Then the stacking part 21 upwardly conveys the bundle of paper subjected to, for example, the stapling processing and discharges it onto a main discharge tray 211.

Arranged below the stacking part 21 is the center folding unit 25. In a case where bending processing has been selected through, for example, inputting on the operation panel 1, the bundle of paper temporarily stacked at the stacking part 21 is conveyed towards the center folding unit 25. The center-binding stapling part 251 can perform, for example, center binding of binding a longitudinal center of the bundle of paper through stapling at two areas along a shorter direction. The center-bound bundle of paper is bent by a projecting bar 252 of the center folding unit 25 and then discharged onto a booklet tray 253.

(Operation Panel 1)

Figure 3:
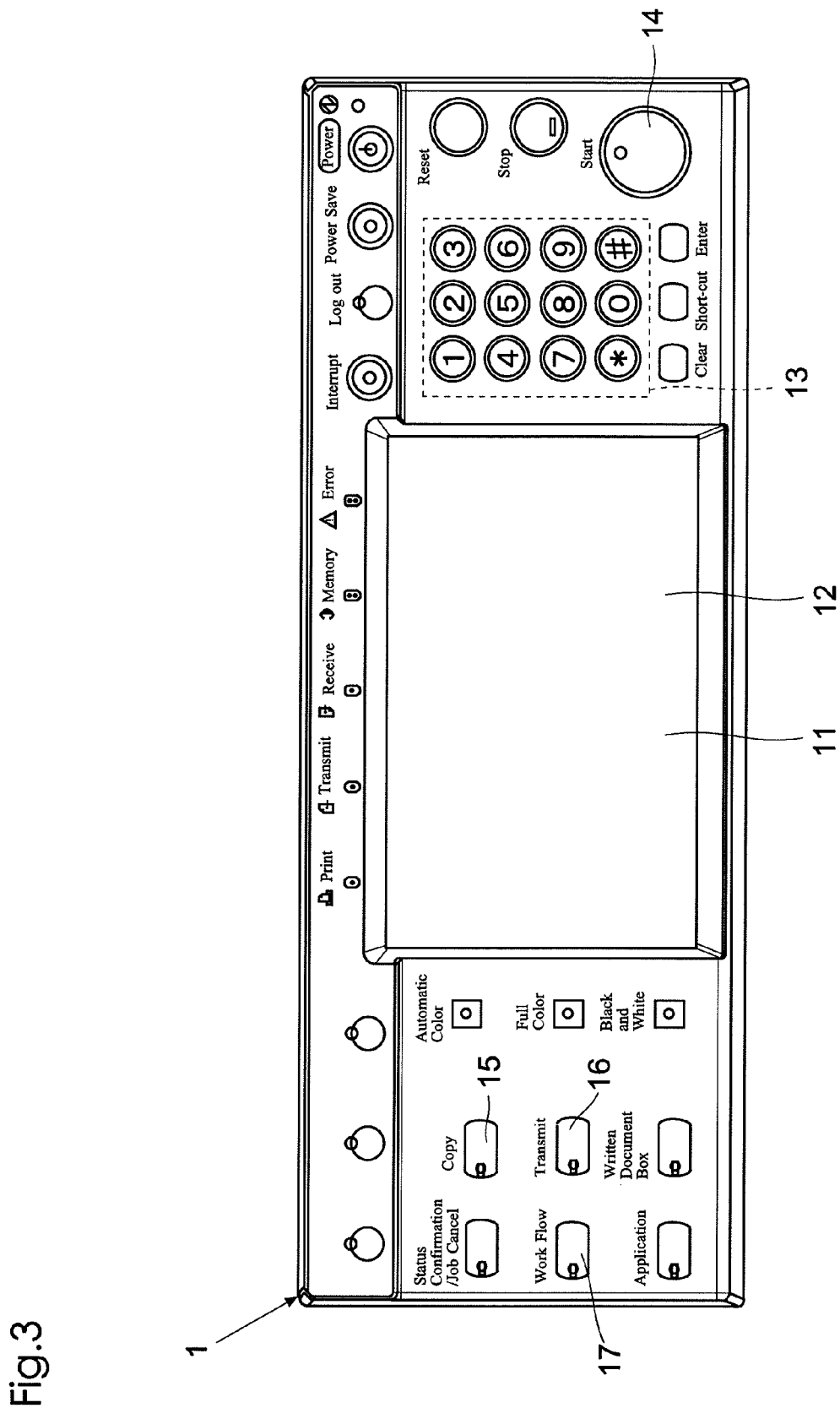
FIG. 3 is a plan view showing one example of an operation panel according to the first embodiment.

Next, referring to FIG. 3, one example of the operation panel 1 according to the first embodiment of the invention will be described. FIG. 3 is a plan view showing one example of the operation panel 1 according to the first embodiment of the invention.

The operation panel 1, as shown in FIGS. 1 and 3, is provided at the top of the MFP 100 in elevation view. The operation panel 1 has: a liquid crystal display part 11 (corresponding to a display part) that displays various kinds of images and screens such as: a menu and keys (see FIG. 5, etc.) for making settings and giving operation instructions for the MFP 100 and the post-processing device 2; and a status message M of, for example, the MFP 100. The user can press the keys displayed at the liquid crystal display part 11 to make various settings in copying by the MFP 100 and make the settings and giving the operation instructions for the post-processing device 2. For example, the user can set and input instructions for performing the stapling processing at the post-processing device 2 and a paper discharge destination.

Provided on a top surface of the liquid crystal display part 11 is a touch panel part 12 (corresponding to an input part), which is provided for the user to detect a position and coordinates of the pressed portion at the liquid crystal display part 11. Through comparison between the coordinates detected with this touch panel part 12 and positions and coordinates of the various keys shown at the liquid crystal display part 11, the key pressed by the user for selection is identified. As the touch panel part 12, no limitation is provided and thus any type such as a resistive film type, a surface acoustic wave type, an infrared type, or an electrostatic capacitance type can be adopted.

Moreover, the operation panel 1 is provided with keys (buttons) as hard keys, which are input parts as described below. For example, the operation panel 1 is provided with: a ten key part 13 for numerical input; and a start key 14 for instructions for starting processing such as copying after various settings are made. Also provided are: a copy key 15 pressed upon using a copy function; a transmit key 16 pressed upon using a scanner function or a Fax function; etc. Further provided is a work flow key 17 (corresponding to an input part) pressed upon work flow creation, registration, or work flow calling, details of which will be described below. As described above, the operation panel 1 is provided with the touch panel part 12 and the various hard keys, and functions as an input part that makes various kinds of settings and performs mode selection, etc. for the various functions of the MFP 100.

(Hardware Configuration of the MFP 100, etc.)

Figure 4:
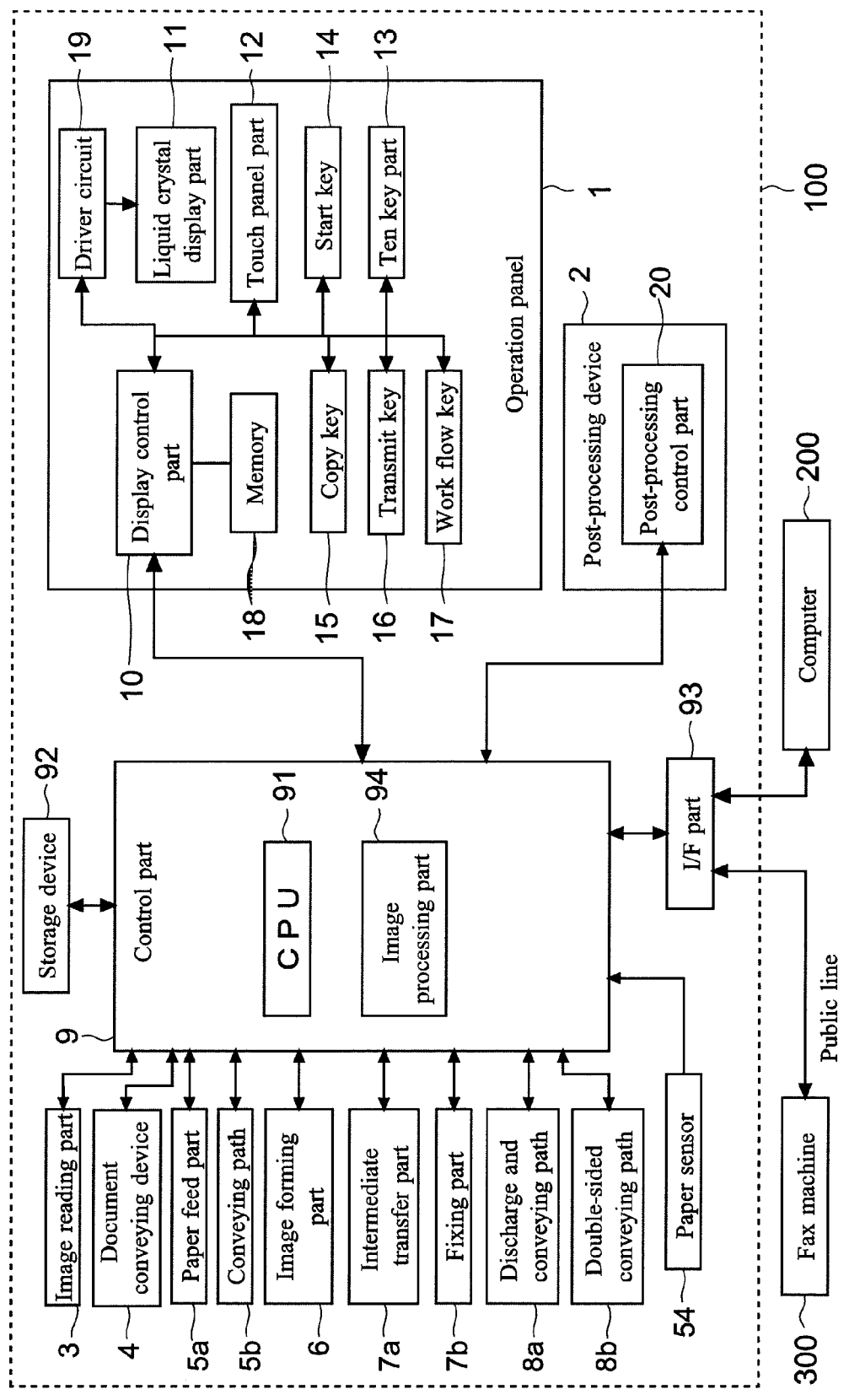
FIG. 4 is a block diagram showing one example of hardware configuration of the MFP according to the first embodiment.

Next, referring to FIG. 4, one example of the hardware configuration of the MFP 100 according to the first embodiment of the invention, etc. will be described. FIG. 4 is a block diagram showing one example of the hardware configuration of the MFP 100 according to the first embodiment of the invention, etc.

First, a main body side of the MFP 100 will be described. In the main body of the MFP 100, a control part 9 is provided. The control part 9 is connected to the operation panel 1, the document conveying device 4, the image reading part 3, the paper feed parts 5*a*, the conveying path 5*b*, the image forming part 6, the fixing part 7*b*, the discharge and conveying path 8*a*, etc., and performs control of these parts.

The control part 9 includes elements such as a CPU 91. The CPU 91 performs, for example, computing based on a control program stored in the storage device 92 (corresponding to a storage part) and loaded to control the various parts of the MFP 100. The control part 9 may be provided in a plurality of kinds classified on an individual function basis, including, for example, a main control part that performs overall control and image processing; an engine control part that performs, for example, image formation and turning On/Off of a motor rotating different rotors to thereby control printing. In this description, these control parts will be shown in a collective mode.

The storage device 92 is connected to the control part 9. The storage device 92 is composed of a combination of non volatile storage devices such as a ROM, a RAM, an HDD, etc. and volatile storage devices. The storage device 92 can store various kinds of data such as a control program, control data, setting data, and image data. Moreover, in the invention in particular, the storage device 92 can store a created work flow (corresponding to a program). The work flow is a combination of setting items preselected from among a plurality of setting items and registered, and is called to thereby display at the display part a screen for making settings for the preselected and preregistered setting items.

The control part 9 is connected to an interface part (hereinafter referred to as I/F part 93) provided with various connectors, a socket, a Fax modem, etc. The I/F part 93 is connected to a plurality of external computers 200 (for example, personal computers) and opposite-side Fax machines 300 (only one each is shown in FIG. 4 for convenience) via a network, a public line, or the like. For example, the I/F part 93 can store the image data obtained at the image reading part 3 into the storage device 92 and transmits it to the external computers 200 and the opposite-side Fax machines 300 (has a scanner function and a Fax function). The I/F part 93 can also, based on the image data transmitted from the computers 200 or the opposite-side Fax machines 300 and inputted to the MFP 100, performs printing, Fax transmission, etc. (has a printer function and a Fax function).

The control part 9 recognizes inputting performed on the operation panel 1, and controls the MFP 100 in a manner such that, for example, copying is performed in accordance with settings made by the user. When a setting for performing stapling by use of the post-processing device 2 or a setting for discharge onto the secondary discharge tray 210 has been made on the operation panel 1, for example, the control part 9 controls the discharge and conveying path 8*a* to have the selector valves 84 and 85 pivot so that the printed paper is conveyed towards the post-processing device 2.

Moreover, for example, the control part 9 is provided with an image processing part 94 that performs image processing on the image data obtained by reading the document at the image reading part 3 and the image data inputted to the MFP 100 through the I/F part 93. For example, the image processing part 94, when settings for page numbering to be described below have been made, performs processing of providing page numbers to the image data in accordance with the settings such as a position, a display mode, etc. of the page numbers. The image data processed by the image processing part 94, for example, is transmitted to the exposure device 61 to be used for the scanning and exposure of the photoconductive drums.

Moreover, the control part 9 is connected to a post-processing control part 20, which is provided in the post-processing device 2 and which performs control of operation of the post-processing device 2, in such a manner as to be communicatable with the post-processing control part 20. For example, the post-processing control part 20, based on instructions given by the control part 9, controls the operation of the punching part 22, the stapling parts 23 and 24, etc. For example the post-processing control part 20 controls rotation of a motor that pivots the guide claw 28. Then the post-processing control part 20, in accordance with instructions given from the control part 9 (for example, instructions for discharge to the secondary discharge tray 210 or the main discharge tray 211, instructions for conveyance to the stacking part 21 for the punching processing, etc.), causes the motor in the post-processing device 2 to make forward and reverse rotation to control a paper conveying direction.

The operation panel 1 of this embodiment has: a display control part 10, a memory 18 (corresponding to a storage part), a driver circuit 19, the liquid crystal display part 11, and the touch panel part 12. The display control part 10 is composed of a CPU, an IC, etc., and controls display of the liquid crystal display part 11 and in response to outputting of the touch panel part 12, identifies the coordinates pressed at the liquid crystal display part 11. Data such as a table showing correspondence between the output of the touch panel part 12 and the coordinates is stored into the memory 18. The display control part 10, for example, through comparison between the coordinates of the pressed position and image data of each setting screen S, identifies and recognizes a key selected (pressed) on the setting screen S.

Specifically, to select the setting item for each function of the MFP 100 and set a set value, selection of a key displayed at the liquid crystal display part 11 from a display provided at an uppermost layer in the liquid crystal display part 11 is repeated. Then for each key selection, the display control part 10 switches the display of the liquid crystal display part 11, and the setting value for the function to be selected and set is finally set. The display control part 10 recognizes that the selection and setting of this function has been made, and transmits their details to the control part 9 in the main body. Consequently, the control part 9 causes the various parts such as the image forming part 6 to perform operation on which the function selected and set on the operation panel 1 is reflected, whereby the user's intention is reflected in printing, etc. (for example, density setting, zooming out/in, etc.).

Then the screen and image data of the image displayed by the liquid crystal display part 11 are stored into, for example, the memory 18 in the operation panel 1. Therefore, every time the key on a selection screen T for selecting a setting item or each setting screen S has been pressed, the display control part 10 reads from the memory 18 image data of the screen to be displayed next.

The screen and the image data of the image displayed by the liquid crystal display part 11 may be stored into, for example, the storage device 92 on the main body side. In this case, the operation panel 1 receives, from the storage device 92 via the control part 9, the image data for providing a display at the liquid crystal display part 11. Upon the reception of this image data, the display control part 10 gives instructions to the driver circuit 19 that actually controls the display of the liquid crystal screen. Note that without providing the operation panel 1 with the display control part 10 and the memory 18, configuration of the control part 9 (the CPU 91 and the storage device 92) may take over functions of the display control part 10 and the memory 18.

(Outline of Work Flow Calling and Usage)

Figure 5:
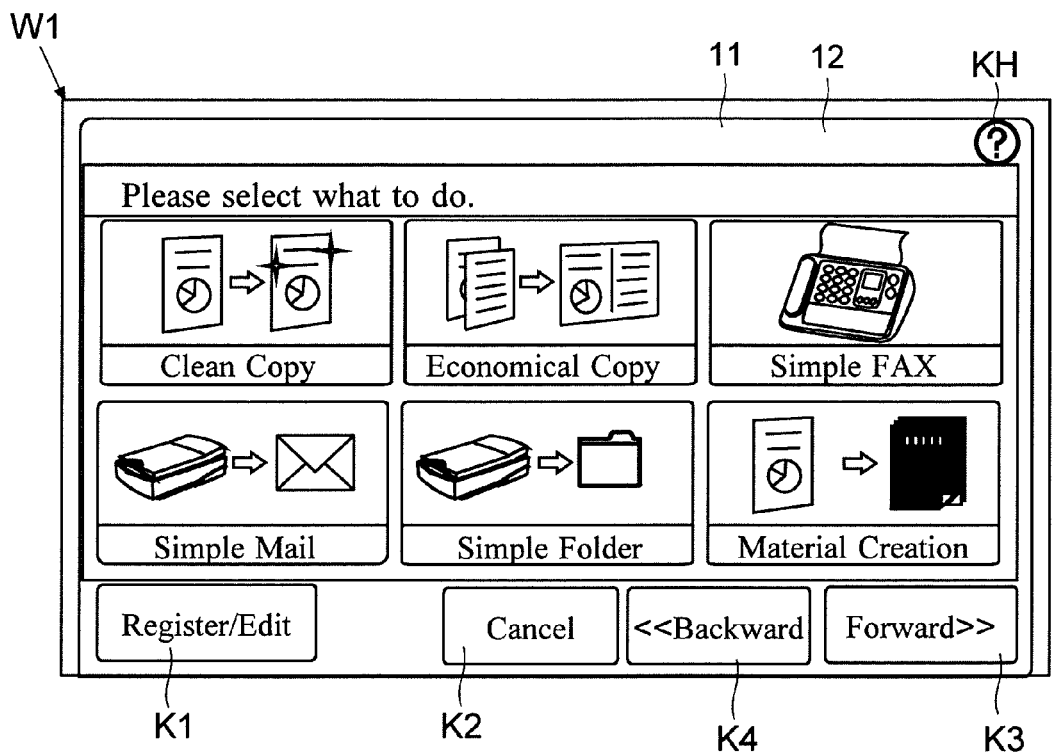
FIG. 5 is an explanatory diagram showing one example of a call screen for work flow selection.

Next, referring to FIGS. 5 to 7, the outline of the work flow according to the first embodiment of the invention and one example of the work flow calling and usage will be described. FIG. 5 is an explanatory diagram showing one example of a call screen W1 for selection of the work flow according to the first embodiment of the invention. FIG. 6 are explanatory diagrams showing one example of a flow of display of the work flow in a wizard format. FIG. 7 is an explanatory diagram showing one example of a menu screen W2 provided when the work flow is displayed in a menu format.

The MFP 100 of this embodiment has a wide variety of settable functions and various setting items. The liquid crystal display part 11 displays the selection screen T for selecting, from among a plurality of setting items, the setting item for which a setting is to be made, and the user selects (presses) the setting item (function) for use in printing or transmission. For example, the liquid crystal display part 11 displays each setting item as a key. Moreover, the liquid crystal display part 11 displays each setting screen S for the selected setting item. The user can press, for example, a key displayed on each setting screen S or a hard key arranged around the liquid crystal display part 11 to make various function selections and settings. Kinds of the setting items and their setting screens S are very large in number, and thus their illustration will be omitted unless described below as an example for convenience and the settable functions (setting items) will be just listed below.

First, in a case where the MFP 100 is used for copying (a copy mode is brought by pressing a copy key 15), the setting items prepared in the MFP 100 are: for example, document image quality (character, photo, character+photo, etc.), copy density, paper selection, magnification, economical printing, a binding margin, center shifting, frame deletion, double-sided/divided (one-sided→double-sided, double-sided→one-sided, two-facing pages→double-sided, etc.), a booklet, covering, a document setting direction, a document size, sorting, classification, black and white reversal, mirror image printing, paging, image synthesis, integration (2 in 1, 4 in 1, etc.), margin addition, continuous reading and batch printing, trial copying, recopying, stapling, punching, etc. The user, through inputting onto the setting screen S for each setting item displayed at the liquid crystal display part 11, sets the setting value in the setting item.

Next, in a case where the MFP 100 is used as a scanner (the MFP 100 can be used as the scanner by pressing the transmit key 16), the setting items prepared for the MFP 100 are: for example, a document size, a transmission size, resolution, a document setting direction, a saved file format, image quality (density, a color mode, a compression rate, image quality of a document such as a photo, a character, or the like, etc.), division, frame deletion, page-by-page outputting, continuous reading, file name inputting, center shifting, destination selection, destination registration, a password, E-mail transmission, opposite-side reception confirmation, etc. The user, through inputting onto the setting screen S for each setting item displayed at the liquid crystal display part 11, sets the setting value in the setting item.

Next, in a case where the MFP 100 is used for Fax (the MFP 100 can be used for FAX by pressing the transmit key 16), the setting items prepared for the MFP 100 are: for example, local station registration (a Fax number, ID, etc.), direct transmission, memory transmission, rotary communication, batch transmission, F code communication, reception in paper-out condition, an abbreviated number, document density, a document size, destination selection, destination registration, redialing, double-sided transmission, zoomed-out/in transmission, reserved transmission, interrupt transmission, time-specified communication, polling communication, relay transmission, received image data transfer, encrypted communication, communication result notification, paper size confirmation, integration (2 in 1, etc.), double-sided reception, etc. The user, through inputting onto the setting screen S for each setting item displayed at the liquid crystal display part 11, sets the setting value in the setting item.

Here, some of the setting items are frequently combined together upon the usage of the MFP 100 by the user; for example, in a case where the integration and double-sided are set in combination for the purpose of reducing paper consumption, and the transmission method and the destination of the image data obtained by reading at the image reading part 3 are combined. However, as described above, a wide variety of setting items (functions) are provided in the MFP 100, and making the same settings upon every usage of the MFP 100 brings about complicatedness and inconvenience.

Thus, the MFP 100 of this embodiment can previously select and create a combination of the setting items frequently used and store the combination of the setting items as a work flow (details of which will be described below). Then the user calls the work flow (a program including data indicating the previously selected setting items, display order, and a display format) stored in the storage device 92, upon which a screen for making a setting for the previously selected setting item is displayed at the liquid crystal display part 11.

For example, the user presses the work flow key 17 (see FIG. 3) to call the preregistered work flow. Then, as shown in FIG. 5, displayed at the liquid crystal display part 11 is the call screen W1 for selecting from among the preregistered work flows, the work flow to be used (called). For example, displayed in FIG. 5 are the work flows named as: "Clean Copy", "Economical Copying", "Simple Faxing", "Simple Mail", "Simple Folder", and "Material Creation". Then by pressing an image of any of the work flows, the pressed work flow is called from the storage device 92 or the memory 18 and the screen for making a setting by the work flow is displayed at the liquid crystal display part 11.

Moreover, disposed below the call screen W1 is a register/edit key K1 pressed for creating a new work flow or editing the already registered work flow. Also disposed is a cancel key K2 for stopping the work flow calling. As shown in FIG. 5, there is limitation on the number of work flows that can be displayed within one screen. Thus, pressing a forward key K3 causes switching to a call screen W1 on the next page, whereby images showing different work flows are displayed. Moreover, pressing a backward key K4 causes switching to a call screen W1 on the last page.

Next, the display and setting made when the work flow has been called will be described. Prepared as display formats of the screen for making a setting when the work flow has been called are: a wizard display format, a menu display format, and a list display format. Which of these display formats is to be used for displaying can be set upon, for example, the work flow registration. Now, an outline of the work flow calling will be described separately for each of the display formats.

[Wizard Display Format]

First, referring to FIG. 6, the wizard display format in the work flow will be described. For example, FIGS. 6A to 6D are work flows related to copying, showing one example of a work flow in the wizard display format in which the work flow "Material Creation" in FIG. 5 is called.

Figure 6A:
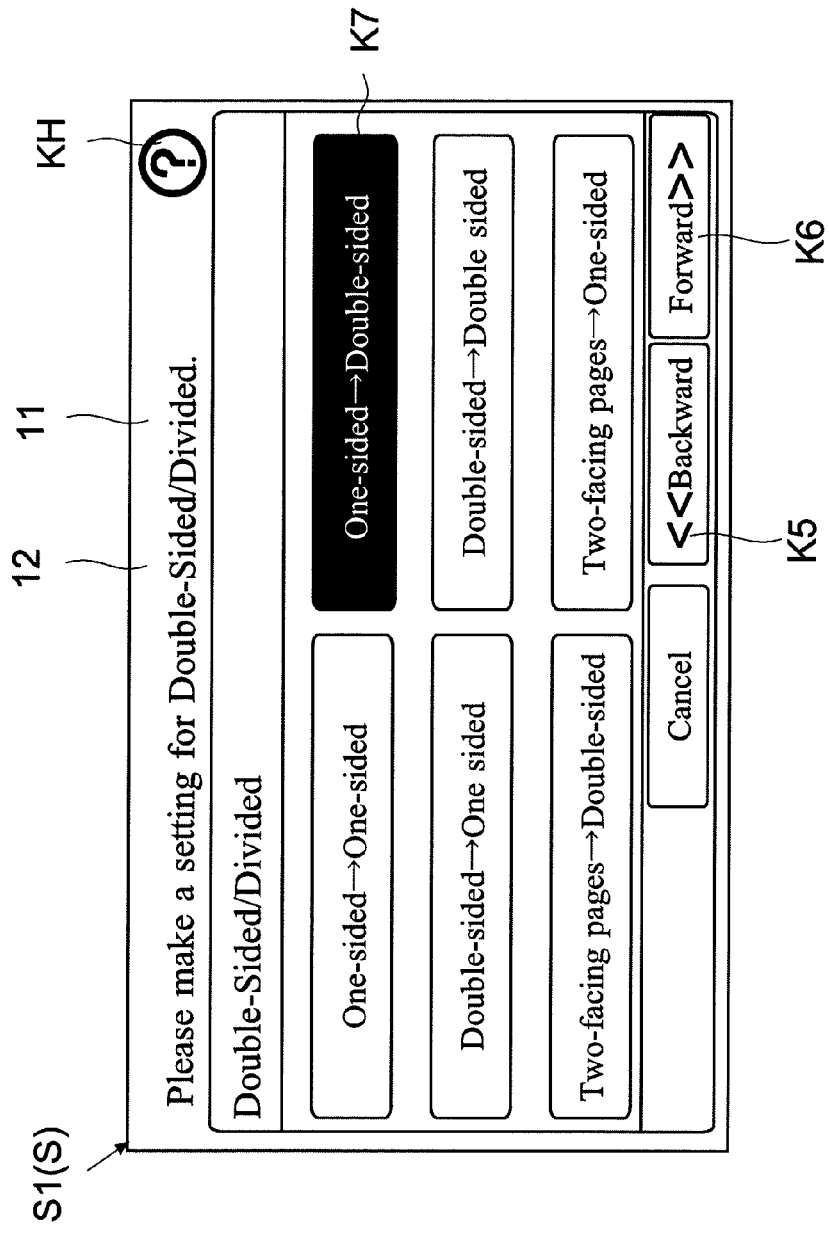
FIG. 6A is an explanatory diagram showing one example of a display screen when the work flow is displayed in a wizard format.
Figure 6B:
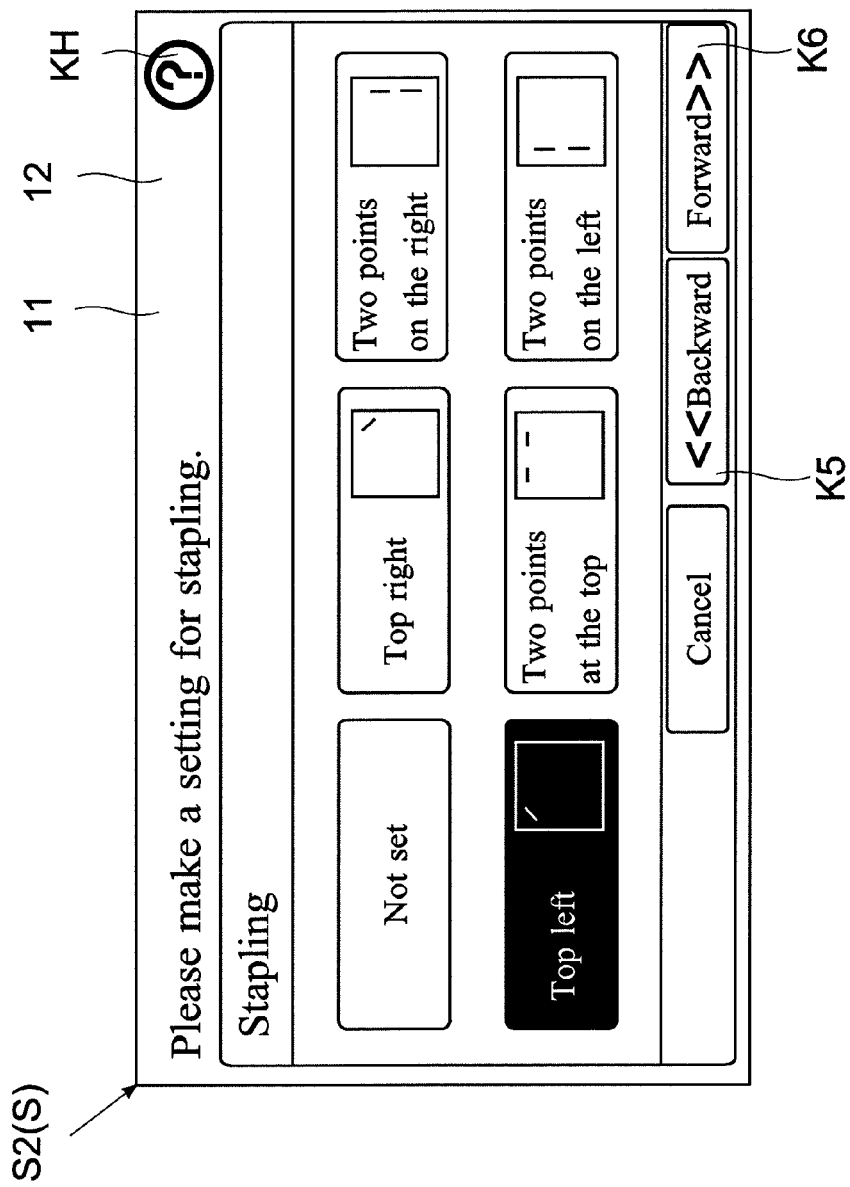
FIG. 6B is an explanatory diagram showing one example of a display screen following the display screen of FIG. 6A.
Figure 6C:
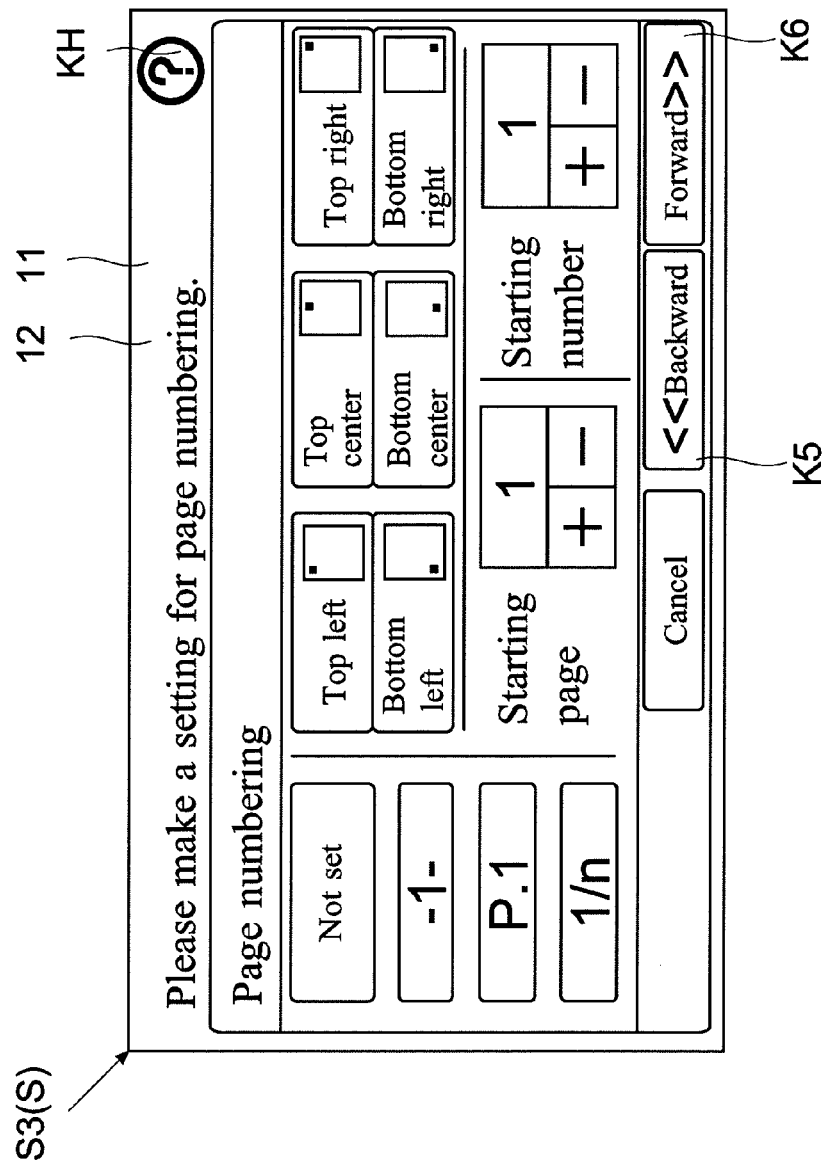
FIG. 6C is an explanatory diagram showing one example of a display screen following the display screen of FIG. 6B.

The work flow shown in FIG. 6 is created and registered in a manner such as to include the setting items "Double-Sided/Divided" (FIG. 6A), "Stapling" (FIG. 6B), and "Paging" (FIG. 6C). Moreover, the work flow is prepared and registered in a manner such that the setting screens S for the respective setting items are displayed in order of the setting screen S1 for "Double-Sided/Divided", the setting screen S2 for "Stapling", and the setting screen S3 for "Page Numbering".

As shown in FIGS. 6A to 6D, a backward key K5 and a forward key K6 are arranged on each setting screen S. When the backward key K5 has been pressed, the liquid crystal display part 11 displays the setting screen S for the last setting item. When the forward key K6 has been pressed, the liquid crystal display part 11 displays the setting screen S for the following setting item. The user, by pressing the setting key arranged in each setting screen S, can set a set value for each setting item. For example, as shown in FIG. 6A or 6B, the key pressed for the setting is displayed with black and white inverted (white characters on black background).

At time of the work flow creation and registration, upon the display of each setting screen S, a default value of the selected and set setting value can be defined. This default value is stored into the storage device 92 as part of the work flow. For example, in a case where the work flow has been prepared so that "One-Sided→Double-Sided" is a default value in Double-Sided/Divided, when the setting screen S1 is displayed for the first time, a one-sided→double-sided key K7 is displayed at the liquid crystal display part 11 in an already-selected state, as shown in FIG. 6A.

Figure 6D:
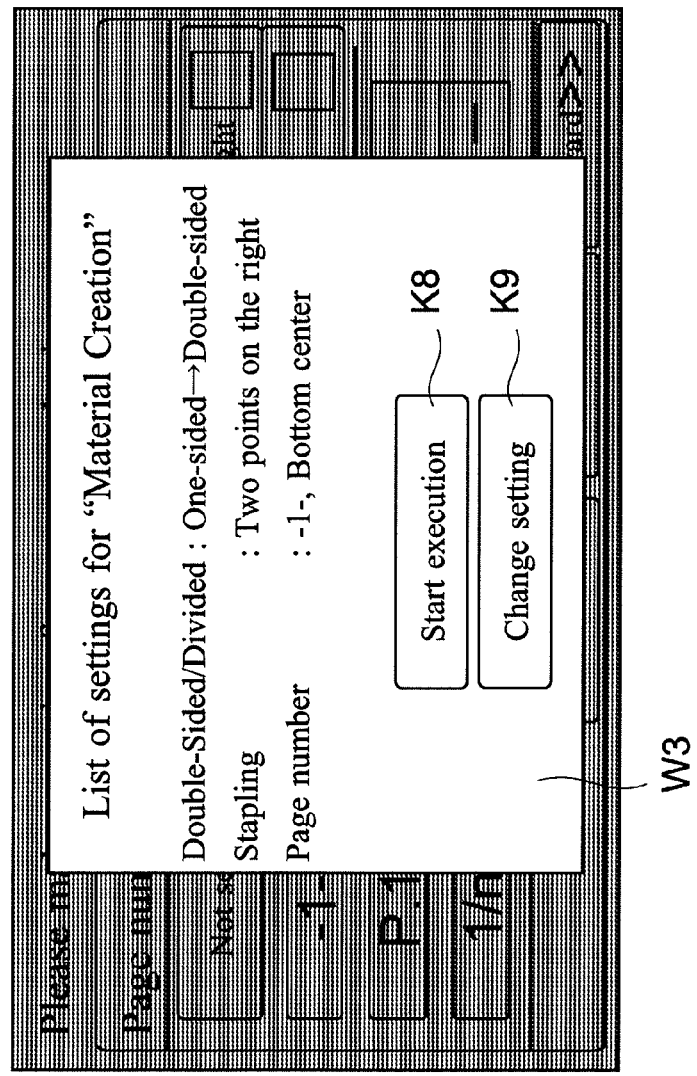
FIG. 6D is an explanatory diagram showing one example of a display of a setting list.
Figure 7:
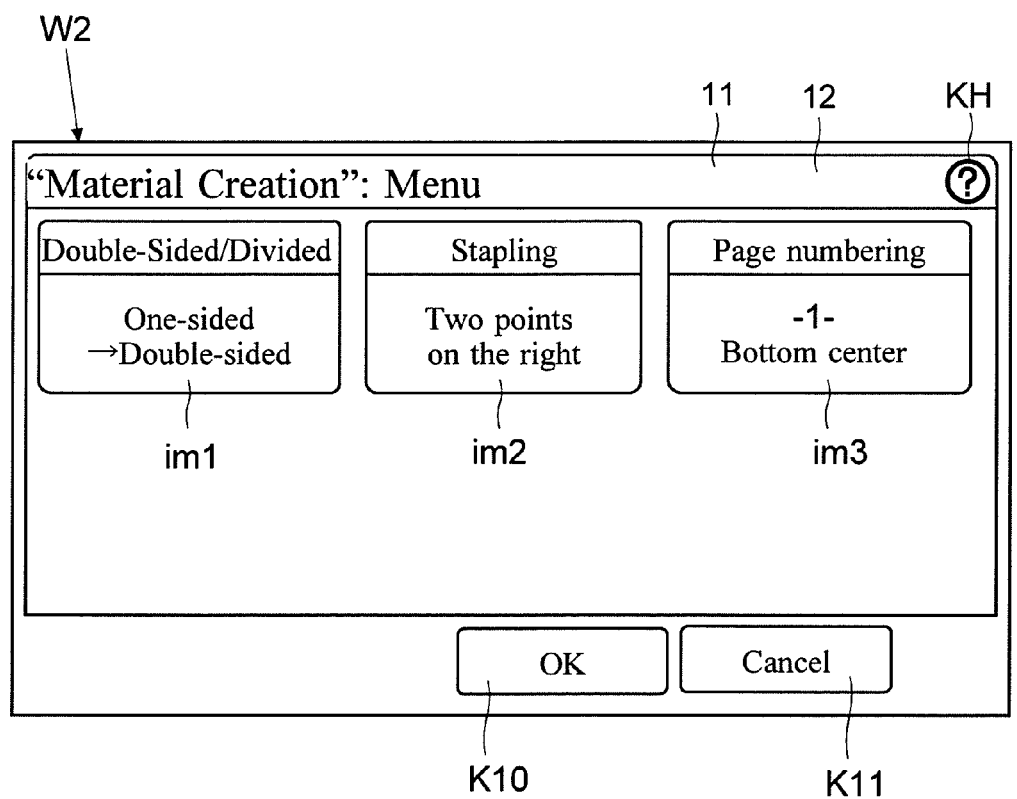
FIG. 7 is an explanatory diagram showing one example of a menu screen provided when the work flow is displayed in a menu format.

Then when the settings for all the three setting items preregistered as the work flow has been completed and the forward key K6 has been pressed on the setting screen S3 for "Page Numbering" shown in FIG. 6C, a setting list W3 is displayed (FIG. 6D). As shown in FIG. 6D, displayed on the setting list W3 are the setting items included in the work flow and the setting values in the respective setting items. Also displayed on the setting list W3 are an execution start key K8 and a setting change key K9. When the execution start key K8 has been pressed, details shown on the setting list W3 are transmitted from the operation panel 1 to the control part 9, which controls the MFP 100 based on the recognized details, whereby copying is performed. When the setting change key K9 has been pressed, for example, the setting screen S1 for "Double-Sided/Divided" of FIG. 6A is displayed again so that the user can make the setting again for the setting item included in the work flow.

[Menu Display Format]

Next, referring to FIG. 7, the menu display format in the work flow will be described. For example, FIG. 7 shows one example of a menu screen W2 in the menu display format in which the work flow "Material Creation" in FIG. 5 has been called.

As shown in FIG. 7, in the menu display format, for example, when the work flow "Material Creation" has been called, a menu image im1 for "Double-Sided/Divided", a menu image im2 for "Stapling", and a menu image im3 for "Page Numbering" are displayed. Therefore, a menu image displayed on the menu screen W2 varies depending on a selected work flow. Also displayed on the respective menu images im are the default setting values or set values separately set. In this manner, in the menu display format, the setting items included in the work flow are displayed as a menu.

The user presses the menu image im of the setting item for which he/she desires to change the setting value. Consequently, for example, the display of the liquid crystal display part 11 switches to the corresponding one of the setting screens S for the respective setting items as shown in FIGS. 6A to 6C. Then when making the setting on the setting screen S has been completed, the display of the liquid crystal display part 11 switches again to the menu screen W2 shown in FIG. 7.

Also arranged on the menu screen W2 are an OK key K10 and a cancel key K11. When the OK key K10 has been pressed, the setting list W3 shown in FIG. 6D is displayed at the liquid crystal display part 11. Details of the setting list W3 may be the same as those of the case described referring to FIGS. 6A to 6D, and thus their description will be omitted. On the other hand, when the cancel key K11 has been pressed, the setting made by use of the work flow is cancelled.

[List Display Format]

Next, referring to FIG. 6D, the list display format in the work flow will be described. In this list display format, when the work flow to be used has been selected on the call screen W1 of FIG. 5, the setting list W3 shown in FIG. 6D is displayed straight away at the liquid crystal display part 11. Details of the setting list W3 may be the same as those of the case of the wizard display format described referring to FIG. 6D, and thus their description will be omitted.

As described above, the display part (liquid crystal display part 11) of the display input device (operation panel 1), when the program has been called, provides a display in any of: the wizard display format in which the setting items included in the program are sequentially displayed in dialogue; the list display format in which the setting items included in the program are displayed in parallel in a list; and the menu display format in which the images showing the respective setting items included in the program are displayed (on one screen).

[Work Flow Creation and Registration]

Figure 8:
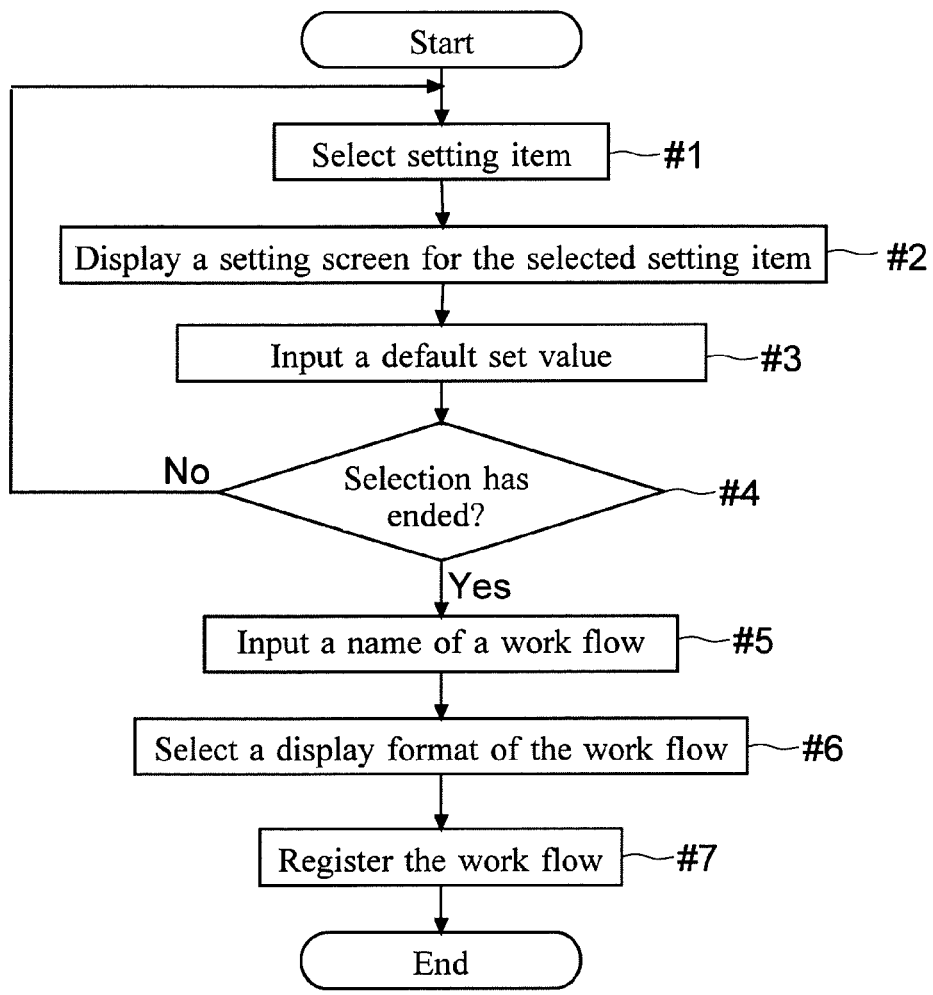
FIG. 8 is a flow chart showing one example of a flow of work flow creation and registration.
Figure 10:
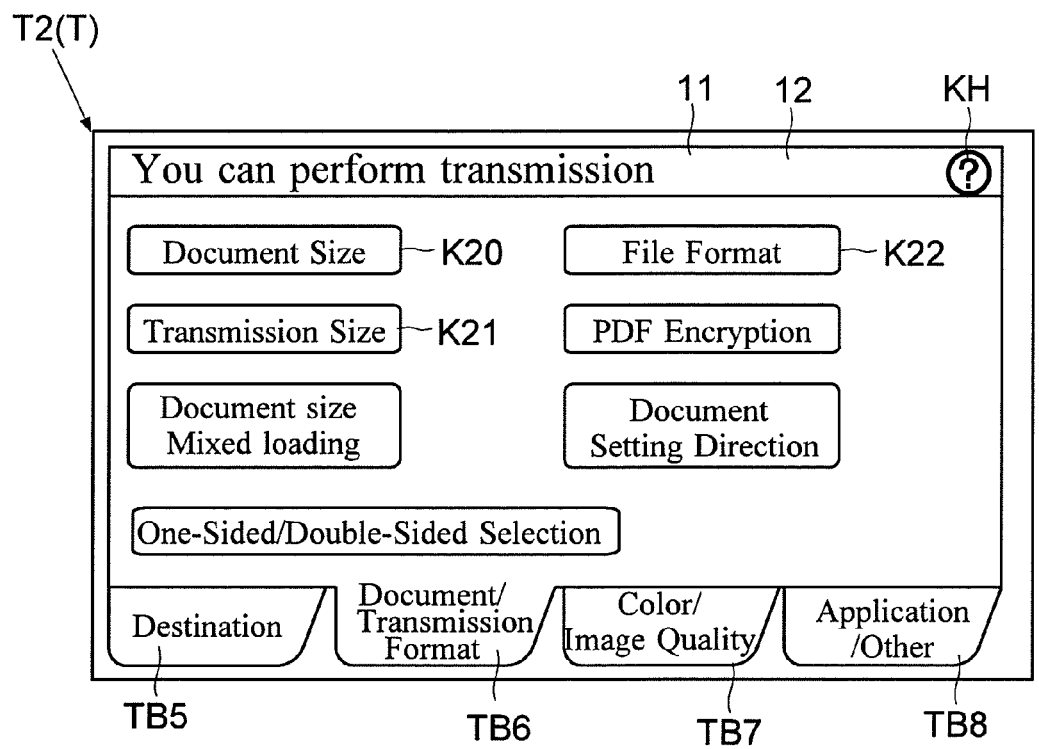
FIG. 10 is an explanatory diagram showing one example of a selection screen for setting items in work flow creation related to transmission.
Figure 11:
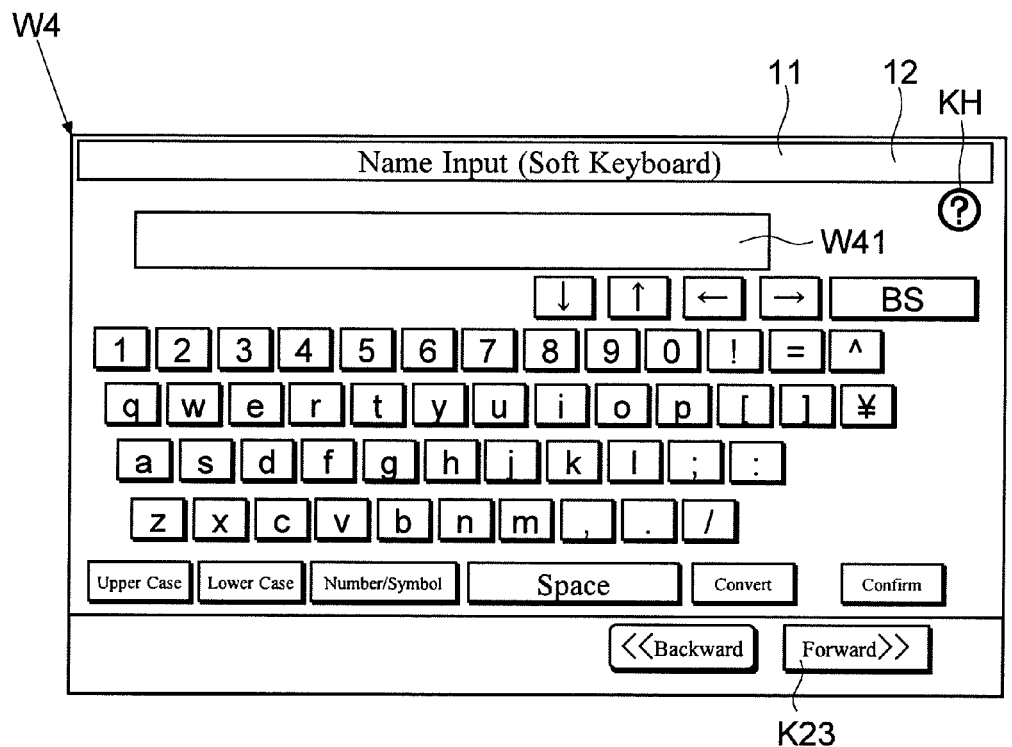
FIG. 11 is an explanatory diagram showing one example of a name input screen for the created work flow.
Figure 12:
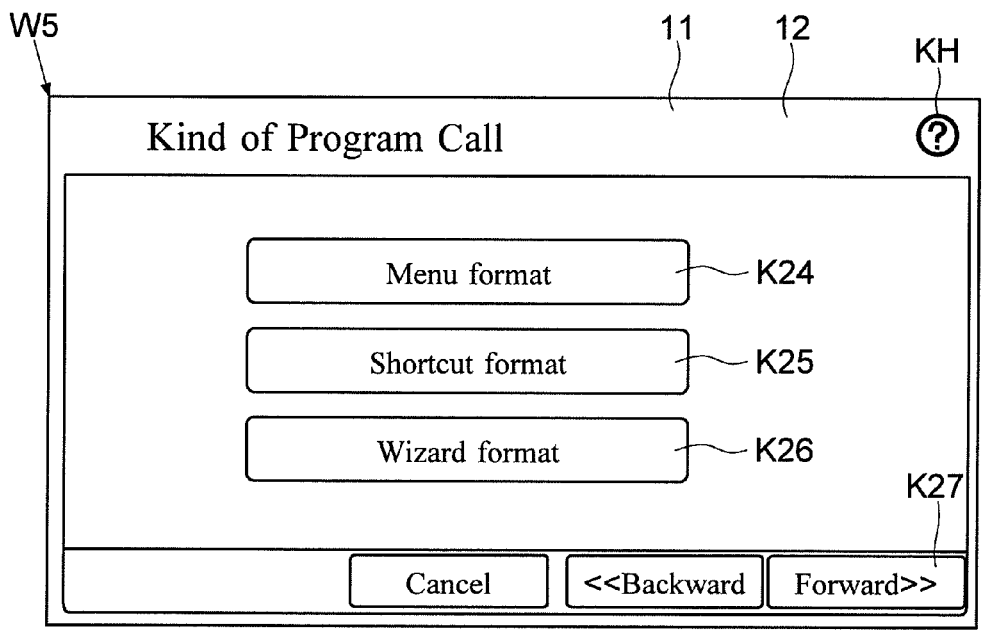
FIG. 12 is an explanatory diagram showing one example of a display format determination screen for defining a display format when the work flow is called.

Next, referring to FIGS. 8 to 12, an outline of the work flow creation and registration in the MFP 100 according to the first embodiment of the invention will be described. FIG. 8 is a flow chart showing one example of a flow of the work flow creation and registration in the MFP 100 according to the first embodiment of the invention. FIG. 9 are explanatory diagrams showing one example of the selection screen T for selecting the setting item in the work flow creation related to copying. FIG. 10 is an explanatory diagram showing one example of the selection screen T for selecting the setting items in the work flow creation related to transmission. FIG. 11 is an explanatory diagram showing one example of a name input screen W4 for the created work flow. FIG. 12 is an explanatory diagram showing one example of a display format determination screen W5 for defining the display format for the work flow calling.

First, start in FIG. 8 corresponds to a time point at which new work flow registration has been started, for example, a case where the work flow key 17 has been pressed and the register/edit key K1 (see FIG. 5) has been pressed on the call screen W1. In other words, the start corresponds to a time point at which a mode of the operation panel 1 has shifted from a normal input mode, in which a setting for, for example, copying is made, to a work flow registration mode. Next, the operation panel 1 receives input for selecting the setting items to be included in the work flow to be created (step #1). Then the display control part 10 and the control part 9 recognize the selected setting items.

[Setting Item Selection]

Now, referring to FIGS. 9 and 10, one example of the selection of the setting items to be included in the work flow will be described.

First, referring to FIG. 9, the setting item selection for creating the work flow related to copying will be described. As shown in FIG. 9, the liquid crystal display part 11, for example, when the copy key 15 has been pressed after the start shown in FIG. 8, displays the selection screen T1 for selecting the setting items related to the copy functions. The liquid crystal display part 11 displays a plurality of tabs including a document/paper/finish tab TB1, an image quality tab TB2, a layout/edit tab TB3, and an application/other tab TB4. Note that a plurality of kinds of tabs may be further provided.

Figure 9A:
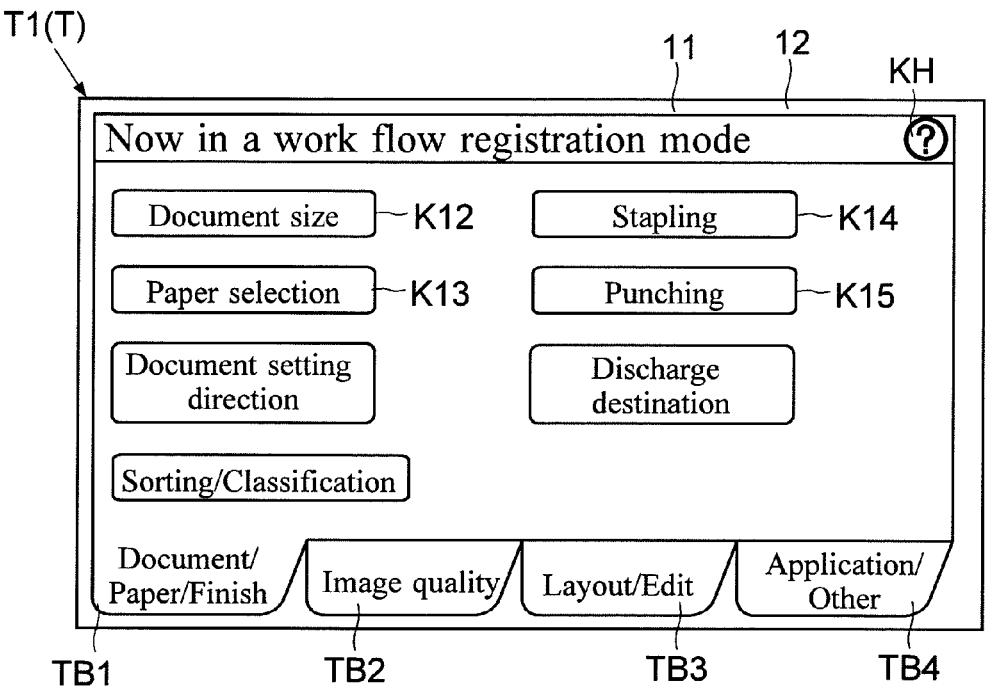
FIG. 9A is an explanatory diagram showing one example of a selection screen for setting items in work flow creation related to copying.

For example, when the document/paper/finish tab TB1 has been pressed, the liquid crystal display part 11, as shown in FIG. 9A, displays the setting items related to the document/paper/finish. The setting items are arranged as keys. For example, when the document/paper/finish tab TB1 has been pressed, provided are: a document size key K12 for setting a size of a document to be read; a paper selection key K13 for setting paper to be used in printing; a staple key K14 for making settings related to the stapling processing; a punch key K15 for making settings related to the punching processing; etc. (setting details are also assigned to the other setting items, although their description is omitted).

Figure 9B:
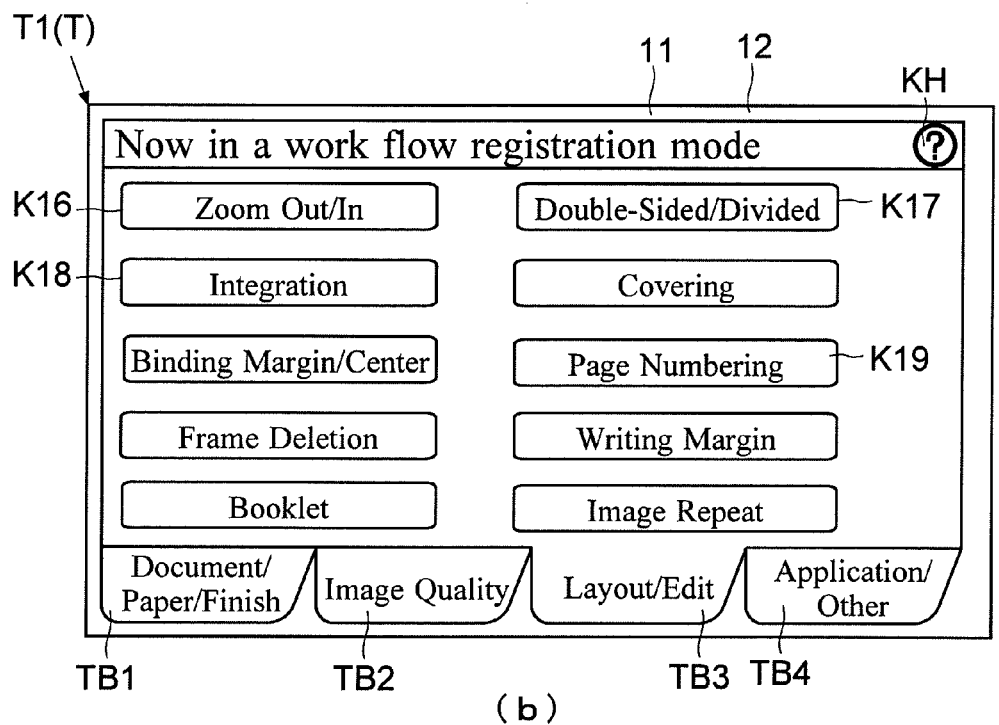
FIG. 9B is an explanatory diagram showing one example of a selection screen for setting items in the work flow creation related to copying.

Moreover, for example, when the layout/edit tab TB3 has been pressed, as shown in FIG. 9B, the setting items related to layout and editing of a page and an image in copying are displayed. Then also on this selection screen T, the setting items are arranged as keys. For example, when the layout/edit tab TB3 has been pressed, arranged are: a zoom out/in key K16 for setting magnification of an image for zooming out/in; a double-sided/divided key K17 for setting double-sided printing or divided printing of pages of a document already subjected to the double-sided printing or a document subjected to printing with two-facing pages; an integrate key K18 for making a setting related to copying including a plurality of pieces of paper in one page; and a page numbering key K19 for making a setting related to page numbering on each piece of copied paper (setting details are also assigned to the other setting items, although their description is omitted).

When the image quality tab TB2 has been pressed, the liquid crystal display part 11 displays keys corresponding to the setting items (for example, density setting) related to image quality. When the application/other tab TB4 has been pressed, the liquid crystal display part 11 displays as keys applied setting items (for example, mirror image printing, white-and-black inverted printing, etc.) related to copying.

Next, referring to FIG. 10, the selection of the setting items for creating the work flow related to transmission will be described. As shown in FIG. 10, the liquid crystal display part 11, for example when the transmit key 16 has been pressed after the start shown in FIG. 8, displays a selection screen T2 (see FIG. 10) for selecting the setting items related to the function of transmitting image data obtained by document reading such as faxing or scanning.

For example, as shown in FIG. 10, the liquid crystal display part 11 displays, within the selection screen T2 for the transmission, a plurality of tabs including a destination tab TB5, a document/transmission format tab TB6, a color/image quality tab TB7, and an application/other tab TB8. Note that a plurality of kinds of tabs may be further provided.

For example, the setting items are arranged as keys. As shown in FIG. 10, when the document/transmission format tab TB6 has been pressed, the setting items related to a transmission format of a document to be read and image data are displayed. Then arranged at the liquid crystal display part 11 are: for example, a document size key K20 for setting a size of the document to be read; a transmission size key K21 for setting a size of the image data to be transmitted; a file format key K22 for setting a format (for example, PDF or TIFF) of the image data to be transmitted, etc. (setting details are also assigned to the other setting items, although their description will be omitted).

When settings have been made for the setting items on these selection screens (T1, T2, etc.), the display control part 10 displays the setting screens S for setting the set values in the selected setting items (step #2). Then the display control part 10 recognizes as default values the set values set by the user (pressed keys indicating the set values) (step #3).

For example, on the selection screen T1 shown in FIG. 9B, the double-sided/divided key K17 is pressed. Then the liquid crystal display part 11 displays the setting screen S1 for double-sided/divided printing as shown in FIG. 6A. The liquid crystal display part 11 also displays a plurality of keys for defining modes of double-sided printing/divided printing on the setting screen S1 for the double-sided/divided key K17.

After such selection of each setting item and setting of the default set value on the setting screen S displayed following the selection, the display control part 10 checks whether or not the setting item selection has ended (step #4). Specifically, for example, the display control part 10 checks whether or not inputting for ending the selection of the setting items to be included in the work flow has been performed. A plurality of kinds may be provided for inputting for ending the selection of the setting items to be included in the work flow. For example, this inputting may be arbitrarily defined, for example, as pressing of the start key 14 or pressing of the work flow key 17 on the selection screen T for selecting the setting items.

If the selection of the setting items to be included in the work flow has not ended (No in step #4), the setting item is added, and thus for example, the processing returns to step #1. On the other hand, if the selection of the setting items to be included in the work flow has ended (Yes in step #4), the display control part 10 displays the name input screen W4 (soft keyboard) for the work flow as shown in FIG. 11.

For example, the user performs inputting on the soft keyboard in the name input screen W4 to thereby perform inputting of adding a name to the work flow in Japanese phonetic syllabaries, Chinese characters, alphabets, or the like (step #5). In accordance with the inputting performed on the soft keyboard by the user, the display control part 10 changes a display of a name display box W41. Then, for example, the display control part 10 recognizes, as the name added to the work flow in creation, contents shown in the name display box W41 when the forward key K23 has been pressed.

Further, the display control part 10 displays a display format determination screen W5 for defining the display format in which the created work flow is called, and the user selects the display format of the work flow (step #6). For example, the display control part 10 displays the display format determination screen W5 as shown in FIG. 12.

For example, the user presses on the display format determination screen W5 any of a menu mode key K24 (menu display format), a shortcut mode key K25 (list display format), and a wizard mode key K26 (wizard display format). The display control part 10 recognizes, as the display format of the work flow in creation, the display format corresponding to the key selected when the forward key K27 has been pressed.

Then the storage device 92 or the memory 18 stores the created work flow, whereby the work flow is registered (step #7→End). For example, the display control part 10 transmits to the control part 9 data, related to the work flow, indicating the name, the display format, the included setting items, display order of the setting items (corresponding to order in which the setting items are selected upon the work flow creation), the default setting values in the setting items, etc., and the storage device 92 or the memory 18 store them as a program. Then the operation panel 1 returns from the work flow registration mode to the normal input mode (End).

(Help Function)

Figure 13:
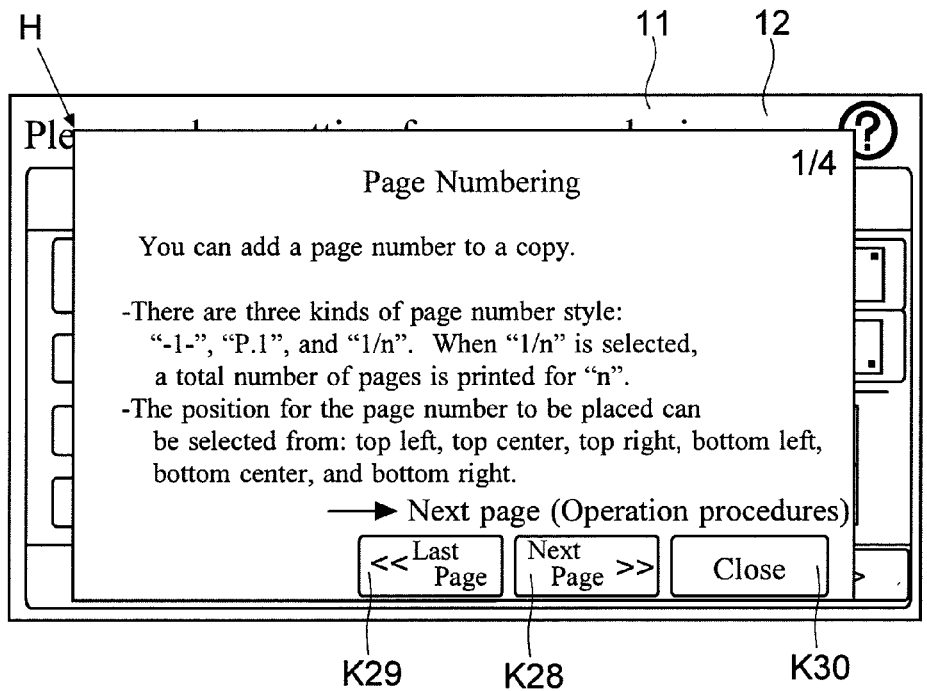
FIG. 13 is an explanatory diagram showing one example of a help screen displayed when the work flow is called.

Next, referring to FIG. 13, one example of the help function in the MFP 100 according to the first embodiment of the invention will be described. FIG. 13 is an explanatory diagram showing one example of a help screen H displayed when the work flow is called.

The MFP 100 of this embodiment is loaded with the help function. Specifically, a help key KH is displayed at part of the liquid crystal display part 11 of the operation panel 1. In the MFP 100 of this embodiment, the help key KH is displayed at an top right corner portion of the liquid crystal display part 11 (see each figure). In this embodiment, the help key KH will be described referring to as an example a case where the help key KH is displayed as software at the liquid crystal display part 11. The help key KH may be arranged as a hard key, like the work flow key 17, around the liquid crystal display part 11 of the operation panel 1.

When this help key KH has been pressed, the liquid crystal display part 11 displays a help screen H for operation on each screen. For example, when the help key KH has been pressed on the setting screen S for a certain setting item (function), the liquid crystal display part 11 displays details of the setting item, details of the different keys arranged on the setting screen S, and a setting method. Through the help function by use of this help key KH, the user can confirm the details of the functions and get knowledge of the setting method.

Now, referring to FIG. 13, one example of the help screen H is shown. FIG. 13 is one example of the help screen H displayed when the work flow "Material Creation" shown in FIG. 5 has been called and the help key KH has been pressed on the setting screen S3 for the setting item "Page Numbering".

For example, as shown in FIG. 13, when the help key KH has been pressed, the liquid crystal display part 11 displays the help screen H at the top of the setting screen S or the selection screen T that has been displayed up to this point. Included on this help screen H are, as shown in FIG. 13, details, such as a function of the setting item, details of the setting item, what setting can be made, setting procedures, etc., which assist the user's understanding. Note that FIG. 13 shows a case of a text-guided description but an explanatory figure, etc. may also be displayed together therewith.

Such a help screen H is prepared for each setting item and each setting method and each operation method to be described. Moreover, data for displaying the help screen H is stored in, for example, the memory 18 of the operation panel 1 (may be stored in the storage device 92). Therefore, depending on the setting item included in the work flow, the help screen H displayed when each work flow has been called varies.

In some cases, one detailed description (for example, setting item) cannot be displayed on only one page of the help screen H. In this case, a plurality of pages of the help screen H are prepared for one detailed description. For example, for the setting item "Page Numbering", four pages of the help screen H are prepared. For example, a total number of pages and the current page are displayed at an top right corner of the help screen H, as shown in FIG. 13.

Moreover, provided at the bottom of the help screen H for switching the page of the help screen H are a next page key K28 and a last page key K29. When either of these keys has been pressed, the liquid crystal display part 11 switches to the help screen H on a page adjacent to the page currently displayed. Moreover, arranged next to the next page key K28 is a close key K30. When the close key K30 has been pressed, the liquid crystal display part 11 stops the display of the help screen H.

(Display of Confirmation Screen C)

Figure 14:
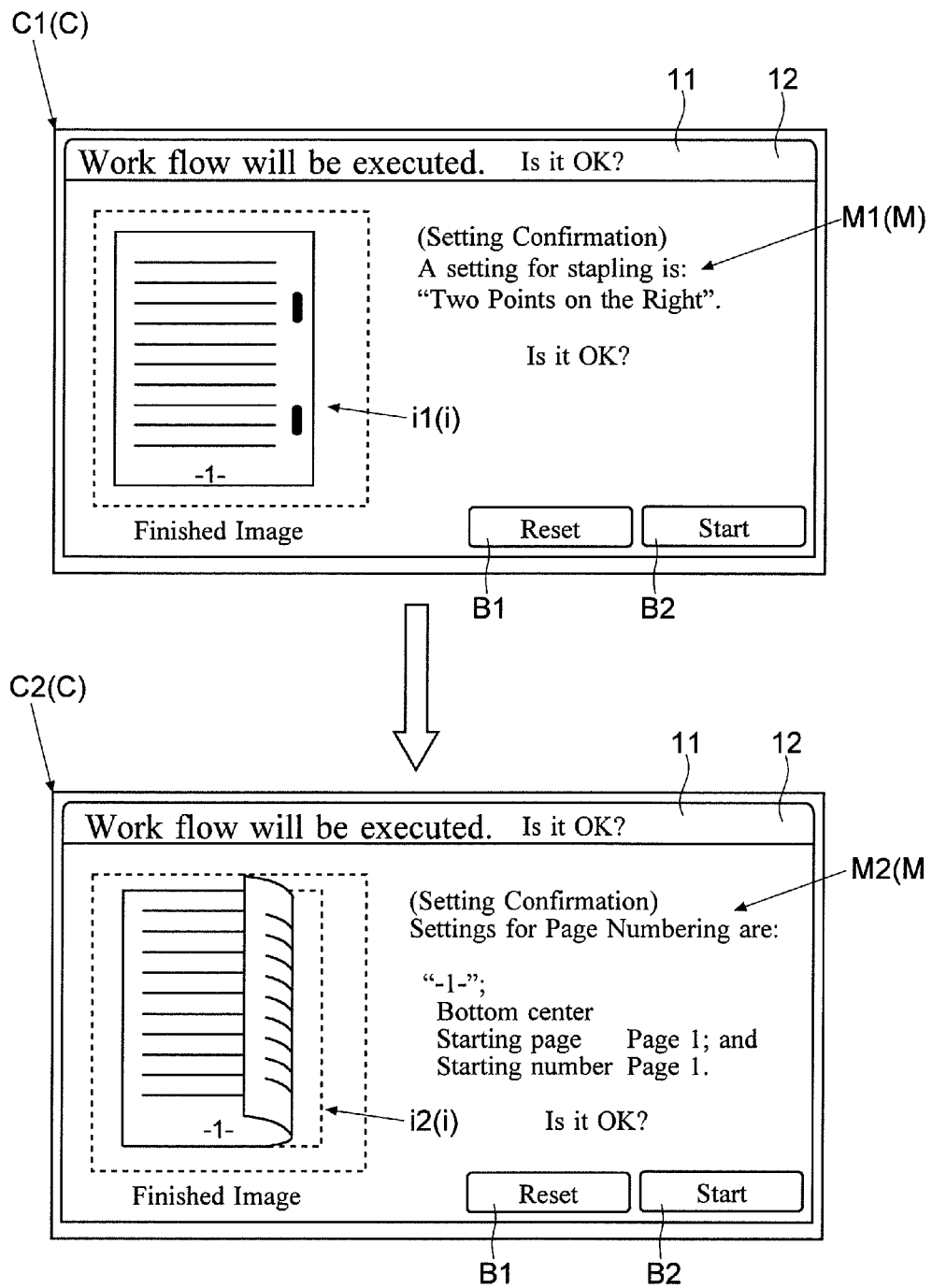
FIG. 14 is an explanatory diagram showing one example of a confirmation screen displayed when the help screen is referenced in the work flow.

Next, referring to FIG. 14, a description will be given concerning one example of the confirmation screen C displayed when the help screen H has been referenced in the work flow according to the first embodiment of the invention. FIG. 14 is an explanatory diagram showing one example of the confirmation screen C displayed when the help screen H has been referenced in the work flow according to the first embodiment of the invention.

First, also this description refers to as an example the case where the work flow "Material Creation" has been called, which has been described referring to FIGS. 5 and 6A to 6C. When this work flow "Material Creation" has been called, continuously pressing the forward keys results in displaying, in a case of the wizard format, the setting screen S1 for "Double-Sided/Divided" shown in FIG. 6A, the setting screen S2 for "Stapling" shown in FIG. 6B, and the setting screen S3 for "Page Numbering" shown in FIG. 6C in order just mentioned. In other words, a series of setting screens S are displayed in succession.

Then, as described above, the user can press the help key KH on each setting screen S, provided when the work flow "Material Creation" has been called, to thereby display the help screen H. A possible example is a case where when a work flow prepared by a different person is used, an unknown setting item is included in the work flow.

Here, assumed in this description is that the help screens H are referenced at the setting items "Stapling" and "Page numbering" in the work flow "Material Creation". Then the storage device 92 or the memory 18 store the setting items for which the help screens H have been displayed, the help functions have been used, and the help screens H have been referenced. Hereinafter, the setting item for which the help screen H has been referenced is referred to as "referenced setting item" for convenience. Specifically in this example of this description, the storage device 92 or the memory 18 store the setting items "Stapling" and "Page numbering" as the referenced setting items.

Then in the MFP 100 of this embodiment, in a case where the help screen H has been referenced, when the execution start key K8 has been pressed on the setting list W3 (see FIG. 6D) displayed upon the ending of making the settings for the setting items included in the work flow, the confirmation screen C is displayed.

For example, the setting item "Stapling" is the referenced setting item for which the help screen H has been referenced, and thus, as shown in an upper diagram of FIG. 14, the liquid crystal display part 11 displays a confirmation screen C1 for confirming whether or not the setting for stapling can be left at the current setting. The liquid crystal display part 11 shows the current set value on the confirmation screen C1. The upper diagram of FIG. 14 shows an example in which a display indicating that the current setting for "Stapling" is "(Stapled at) Two points on the right" is provided as a message M1 on a right half of the screen.

Moreover, the liquid crystal display part 11 displays on the confirmation screen C1 a finished image obtained by performing processing at the current setting. The upper diagram of FIG. 14 shows an example in which the liquid crystal display part 11 provides on a left half of the screen a finished image i1 obtained in a case where the processing of "(Stapling at) Two points on the right" is performed at the current setting for "Stapling".

Moreover, as shown in the upper diagram of FIG. 14, the liquid crystal display part 11 displays, for example, a reset button B1 and a start button B2 at the bottom right of the confirmation screen C1. Viewing the message M1 for the current setting and the finished image i1, the user may notice that "a finish is different from what he/she assumed". For this reason, the reset button B1 is provided. When the reset button B1 has been pressed, the liquid crystal display part 11 displays the setting screen S for "Stapling", as shown in FIG. 6B. Then the user can perform resetting (correct the setting). Therefore, he/she can jump directly from the confirmation screen C to the setting screen S for performing the resetting. On the other hand, the start button B2 is pressed in a case where there is no problem with the setting.

Moreover, for example, in addition to the help screen H for the setting item "Stapling", the help screen H for "Page numbering" is referenced. In other words, the setting item "Page Numbering" is the referenced setting item. Thus, after the start button B2 is pressed on the confirmation screen C1, as shown in a lower diagram of FIG. 14, the liquid crystal display part 11 displays a confirmation screen C2 for confirming whether or not the settings for "Page numbering" can be left at the current settings.

The liquid crystal display part 11 shows the current set values on the confirmation screen C2. The lower diagram of FIG. 14 shows an example in which the liquid crystal display part 11 provides at a right haft of the screen a display as a message M2 indicating that the current settings for "Page numbering" are in a mode of "-1-", a position where a page number is placed is "bottom center", etc.

As described above, the confirmation screens C (for example, C1 and C2) are respectively displayed for the setting items (referenced setting items) for which the help screens H have been referenced in the work flow. This permits confirming for each setting item whether there is any error in the setting.

Moreover, the liquid crystal display part 11 displays a finished image obtained when processing is performed at the current settings. The lower diagram of FIG. 14 shows an example in which the liquid crystal display part 11 provides, at a left half of the screen, a finished image i2 obtained when the processing of page numbering at a position of the bottom center in the mode of "-1-" is performed.

Moreover, as shown in the lower diagram of FIG. 14, the liquid crystal display part 11 also displays a reset button B1 and a start button B2 at the bottom right of the confirmation screen C2. When the reset button B1 has been pressed, the liquid crystal display part 11 displays the setting screen S for "Page numbering" shown in FIG. 6C. Then the user can perform resetting (correct the setting). On the other hand, the start button B2 is pressed in a case where there is no problem with the setting. This description refers to a case where there are two setting items (referenced setting items) for which the help screens H have been referenced, and thus when the start button B2 has been pressed on the confirmation screen C2, a copying (printing) job is started.

The work flow includes the setting item "Double-Sided/Divided". Thus, as shown in the lower diagram of FIG. 14, the finished image i2 may show a state in which all processing has been performed. Thus, for example, the liquid crystal display part 11 may perform animation display of switching between the finished image i1 in the upper diagram of FIG. 14 and the finished image i2 in the lower diagram of FIG. 14 on both the confirmation screen C1 and the confirmation screen C2. Note that a finished image i only subjected to the processing for the setting item to be confirmed on the confirmation screen C may be shown.

The confirmation screen C is prepared for each setting item, and image data for displaying the confirmation screen C (image data for the finished image i and data for the message M) is stored into, for example, the memory 18 of the operation panel 1 (may be stored into the storage device 92). The display control part 10, upon the display of the confirmation screen C, obtains the data from, for example, the memory 18 and displays it at the liquid crystal display part 11. Therefore, the liquid crystal display part 11 can display the confirmation screen C in accordance with details of the setting item for which the help screen H has been referenced.

(Display Control of Confirmation Screen C)

Figure 15:
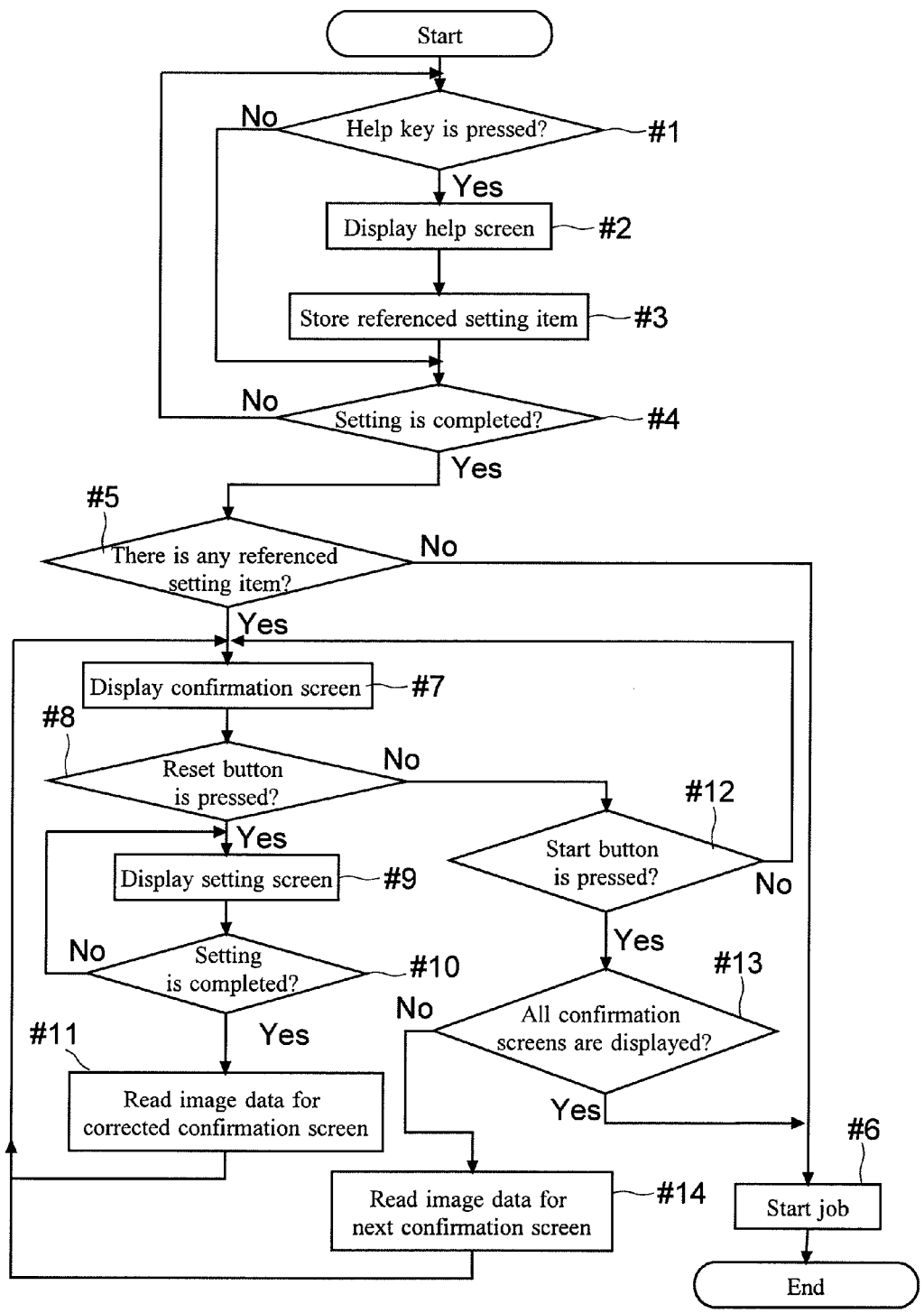
FIG. 15 is a flow chart showing one example of display control according to the first embodiment.

Next, based on FIG. 15, one example of the display control of the confirmation screen C according to the first embodiment of the invention will be described. FIG. 15 is a flow chart showing one example of the display control of the confirmation screen C according to the first embodiment of the invention. First, start in FIG. 15 corresponds to a time point at which the work flow has been called from the storage device 92 or the memory 18 by, for example, pressing the work flow key 17 and selecting the work flow on the call screen.

At this point, the display control part 10 checks whether or not the help key KH has been pressed on the setting screen S for any of the setting items included in the work flow (step #1). If the help key KH has been pressed (Yes in step #1), the display control part 10 displays the help screen H at the liquid crystal display part 11 (step #2). Further, the storage device 92 or the memory 18 stores as the referenced setting item the setting item for which the help screen H has been referenced (step #3).

If the help key KH has not been pressed (No in step #1), or after step #3, the display control part 10 checks whether or not making the settings for the setting items in the work flow has been completed (step #4). Specifically, the display control part 10 checks whether or not the execution start key K8 on the setting list W3 has been pressed. If the execution start key K8 (see FIG. 6D) has not been pressed (No in step #4), the setting in the work flow is to be continued and the processing returns to step #1. In a loop of steps #1 to #4, settings by use of the work flow, such as switching of the setting screen S and setting of the set value, are made.

On the other hand, if the execution start key K8 has been pressed (Yes in step #4), the display control part 10 checks whether or not there is any referenced setting item as a result of pressing the help key KH (step #5). In other words, the display control part 10 checks the storage device 92 or the memory 18 to check a history of display and reference of the help screen H.

If the help screen H has never been referenced (there is no referenced setting item) (No in step #5), the control part 9 controls the image forming part 6, etc., whereby a job based on the settings of the work flow is started (step #6). The job start completes the control for displaying the confirmation screen C (End).

On the other hand, if there is a referenced setting item (Yes in step #5), the display control part 10 displays the confirmation screen C for the referenced setting item at the liquid crystal display part 11 (step #7). Then as described above, the liquid crystal display part 11 displays on the confirmation screen C the finished image i, the massage M for the current setting, etc. That is, the display part (liquid crystal display part 11) displays on the confirmation screen C at least an image (finished image i) indicating a finish obtained when processing for the referenced setting item has been performed. Moreover, the display part displays on the confirmation screen C the message M indicating the current setting for the referenced setting item (see FIG. 14).

Then the display control part 10 checks whether or not the reset button B1 has been pressed on the confirmation screen C (step #8). If the reset button B1 has been pressed (Yes in step #8), the display control part 10 displays at the liquid crystal display part 11 the setting screen S for the setting item corresponding to the confirmation screen C (step #9). That is, the display part (liquid crystal display part 11) displays on the confirmation screen C the reset button B1 for making a setting again for the referenced setting item, and displays the setting screen S for the referenced setting item when the reset button B1 has been selected by inputting to the input part (touch panel part 12 or the like).

Then the display control part 10 continues checking whether or not making a setting on the setting screen S has been completed (step #10, if No in step #10, the processing returns to step #9). For example, if the start key 14 has been pressed on the setting screen S for the referenced setting item, the display control part 10 judges that making a setting on the setting screen S has been completed.

If making a setting on the setting screen S has been completed (Yes in step #10), the display control part 10, in order to switch the display of the confirmation screen C in accordance with the resetting (correction) on the setting screen S, reads image data for the confirmation screen C from the memory 18 in accordance with details of the resetting (step #11). Then, for example, the processing returns to step #7.

On the other hand, if the reset button B1 has not been pressed (No in step #8), the display control part 10 checks whether or not the start button B2 has been pressed on the confirmation screen C (step #12). If the start button B2 has not been pressed (No in step #12), the processing may return to step #7. On the other hand, if the start button B2 has been pressed (Yes in step #12), the display control part 10 checks whether or not all the confirmation screens C have been displayed (step #13).

If all the confirmation screens C for all the setting items for which the help screens H have been referenced in the work flow have been displayed (Yes in step #13), job execution is started (step #6). On the other hand, if all the confirmation screens C for all the setting items for which the help screens H have been referenced in the work flow have not yet been displayed (No in step #13), the display control part 10, in order to switch the confirmation screen C to be displayed, reads image data for the next confirmation screen C from the memory 18 (step #14). Then the processing returns to step #7.

As described above, in the invention of the first embodiment, the image forming apparatus (for example, the MFP 100) is provided with: the image forming part 6 for forming an image; the display part (liquid crystal display part 11) for performing displaying; storage parts (the storage device 92 or the memory 18) for storing a program (work flow) which is a combination of setting items preselected from among a plurality of function setting items and then preregistered and which is called to thereby display at the display part the setting screen S for setting the preselected and preregistered setting item; the input part (touch panel 12, etc.) for receiving job start instructions; and the help key KH to be pressed to thereby display at the display part the help screen H for making a setting for the setting item. In the setting by the called program, when the help key KH has been pressed, the display part, after the job start instructions are given to the input part and before processing is performed for the referenced setting item as the setting item for which the help screen H has been referenced by pressing the help key KH, displays the confirmation screen C for confirming whether or not processing may be performed at the current setting for the referenced setting item.

Consequently, upon the job execution, the user can confirm details of the setting for the referenced setting item. Therefore, the user can confirm whether or not there is any setting error. Moreover, a mistake that the job is performed with the setting error present can be eliminated.

Moreover, in a case where the user has identified the setting error on the confirmation screen C, he/she can immediately perform resetting for the referenced setting item. Therefore, without efforts and time spent in making a setting again from the beginning or in tracing back the flow of the program (work flow) and then performing inputting for reaching the setting screen S for the target referenced setting item, resetting for the referenced setting item can easily be performed.

Moreover, the user can visually identify the actual finish. Therefore, he/she can visually judge whether or not there is any setting error, which makes it easy to make judgment on the presence and absence of the setting error.

Moreover, the user can confirm details of the current setting based on written information. Therefore, the user can judge whether or not there is any setting error.

Second Embodiment

Figure 16:
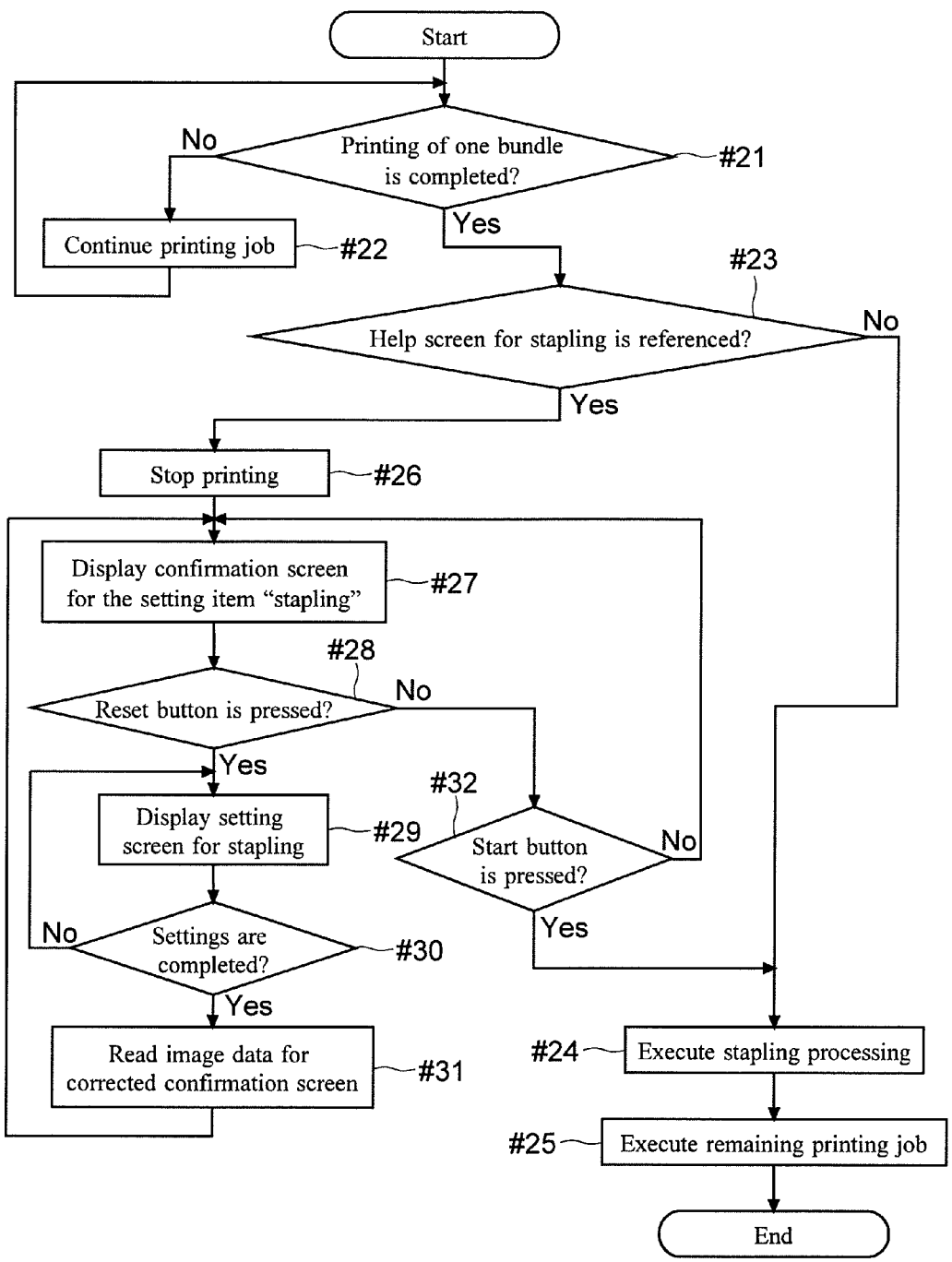
FIG. 16 a flow chart showing one example of display control according to a second embodiment.

Next, referring to FIG. 16, the second embodiment of the invention will be described. FIG. 16 is a flow chart showing one example of display control according to the second embodiment of the invention.

A MFP 100 of this embodiment is different in that, for stapling processing at the post-processing device 2, a confirmation screen C is displayed after stocking is completed, but it may be equal to the first embodiment in configuration of the MFP 100 and other portions. Thus, portions common to the first embodiment and the second embodiment will be omitted from description and illustration.

First, in this embodiment, as is the case with the first embodiment, when a work flow has been called to make a setting, for the setting items other than those for the processing (for example, double-sided printing and page numbering) at the post-processing device 2, the confirmation screen C is displayed before printing is actually started. This description refers to a case where the work flow including a setting item "stapling" is called to make a setting.

Start in FIG. 16 corresponds to, for example, a time point at which settings have been made by use of the work flow including the setting item "Stapling", a plurality of documents have been loaded on the document conveying device 4, and then printing has started. The control part 9 checks, for example, by checking output of a paper sensor 54, whether or not printing one bundle to be processed by the post-processing device 2 has been completed (step #21). If the printing of one bundle has not yet been completed, the control part 9 continues the printing job (step #22). Then the processing returns to step #21.

For example, provided above the fixing part 7b is the paper sensor 54 for detecting arrival and passage of already fixed paper (see FIG. 1). The paper sensor 54 can use a transmissive optical sensor that provides different outputs for a case where paper is present in a detection region and a case where no paper is present therein (for example, ON and OFF). Note that the paper sensor 54 may be, for example, a mechanical switch, as long as it can detect the paper arrival and passage.

The output of the paper sensor 54 is inputted to, for example, the control part 9 (see FIG. 4). For example, the control part 9 counts frequencies with which the output of the paper sensor 54 has switched and recognizes that printing of paper on the last page of one bundle of printed paper has been performed. Time required for completing printing of one piece of paper since start of paper feed at the paper feed part 5a is determined in design. Thus, the control part 9, based on passage of the required printing time since feed of the paper on the last page of one bundle of the printed paper, may recognize that the printing of the paper on the last page has been performed.

On the other hand, if the printing of one bundle has been completed (Yes in step #21), the control part 9 checks whether or not the help screen H has been referenced for the setting item "Stapling" (step #23). If the help screen H has not been referenced for the setting item "Stapling" (No in step #23), the control part 9 instructs the post-processing control part 20 to perform the stapling processing (step #24). Then the printing jobs such as discharge of the stapled paper, printing of the remaining number of copies, and stapling are executed (step #25), and the display control of the confirmation screen C in this embodiment ends (End).

On the other hand, if the help screen H has been referenced for the setting item "Stapling" (Yes in step #23), the control part 9 stops printing, such as the paper feed from the paper feed part 5a and the toner image formation at the image forming part 6 or the like (step #26).

Then the display control part 10 displays at the liquid crystal display part 11 the confirmation screen C for the setting item "Stapling" (step #27). Next, the display control part 10 checks whether or not the reset button B1 has been pressed on the confirmation screen C for the setting item "Stapling" (step #28). If the reset button B1 has been pressed (Yes in step #28), the display control part 10 displays at the liquid crystal display part 11 the setting screen S for the setting item "Stapling" (step #29). Then the display control part 10 continues to check whether or not making a setting on the setting screen S has been completed (step #30, if No in step #30, the processing returns to step #29). If making a setting on the setting screen S has been completed (Yes in step #30), the display control part 10, in order to switch the display of the confirmation screen C in accordance with the resetting (correction) on the setting screen S, reads image data for the confirmation screen C from the memory 18 in accordance with contents of resetting (step #31). Then for example, the processing returns to step #27.

On the other hand, if the reset button B1 has not been pressed (No in step #28), the display control part 10 checks whether or not the start button B2 has been pressed on the confirmation screen C (step #32). If the start button B2 has not been pressed (No in step #32), the processing may return to step #27. On the other hand, if the start button B2 has been pressed (Yes in step #32), the processing proceeds to step #24, where a subsequent job is executed and the control ends (End).

As described above, in the invention of the second embodiment, the image forming apparatus (MFP 100) is provided with the post-processing device 2 which receives printed paper on which an image formed by the image forming part 6 has been printed and then performs post-processing. The program (work flow) includes setting items related to functions of the post-processing device 2, and if a referenced setting item is a setting item related to the post-processing device 2, after start of printing, the image forming part 6 temporarily stops image formation before the post-processing device 2 executes their referenced setting item, and the display part (liquid crystal display part 11), while the image forming part 6 is temporarily stopped, displays the confirmation screen C for confirming whether or not processing may be performed at the current setting for the referenced setting item of the post-processing device 2.

Consequently, immediately before the post-processing is actually performed at the post-processing device 2, confirmation of the referenced setting item related to the post-processing device 2 can be performed.

The first and second embodiments of the invention have been described above, but the invention is not limited to them and thus various modifications can be made within a range not departing from spirits of the invention.

For example, described in the above example is the work flow related to copying, but the invention is also applicable to work flow setting related to image data transmission.

What is claimed is:

1. An image forming apparatus comprising:
   an image forming part forming an image;
   a display part making a display;
   a storage part storing a program being a combination of setting items preselected from among setting items of a plurality of functions and preregistered, the program being called to thereby display at the display part a setting screen for making a setting for the preselected and preregistered setting item;
   an input part receiving the setting made for the setting item and instructions for starting a job; and
   a help key to be pressed for displaying at the display part a help screen for the setting for the setting item,
   wherein when the help key has been pressed in the setting by the called program, the display part, after the instructions for starting a job are given to the input part, before processing is performed for a referenced setting item as the setting item for which the help screen has been referenced, displays a confirmation screen for confirming whether or not the processing may be performed at the current setting for the referenced setting item.

2. The image forming apparatus according to claim 1, wherein the display part displays on the confirmation screen a reset button for making a setting again for the referenced setting item, and when the reset button has been selected by inputting to the input part, displays the setting screen for the referenced setting item.

3. The image forming apparatus according to claim 1, wherein the display part displays on the confirmation screen at least an image indicating a finish obtained when the processing for the referenced setting item has been performed.

4. The image forming apparatus according to claim 3, wherein the referenced setting item is plurally provided, the display part displays on the confirmation screen an image indicating a finish already subjected to processing for the plurality of referenced setting items.

5. The image forming apparatus according to claim 1, wherein the display part displays on the confirmation screen a message indicating a current setting for the referenced setting item.

6. The image forming apparatus according to claim 1, further comprising a post-processing device receiving printed paper on which the image formed by the image forming part has been printed and then performing post-processing,
wherein the program includes a setting item related to a function of the post-processing device, and
when the referenced setting item is the setting item related to the post-processing device,
the image forming part, after start of printing, temporarily stops the image formation before the post-processing device executes the referenced setting item thereof, and
the display part, while the image forming part is temporarily stopped, displays a confirmation screen for confirming whether or not processing may be performed at a current setting for the referenced setting item of the post-processing device.

7. The image forming apparatus according to claim 6, wherein the display part displays on the confirmation screen a reset button for making a setting again for the referenced setting item, and when the reset button has been selected by inputting to the input part, displays the setting screen for the referenced setting item.

8. The image forming apparatus according to claim 6, wherein the display part displays on the confirmation screen at least an image indicating a finish obtained when the processing for the referenced setting item has been performed.

9. The image forming apparatus according to claim 8, wherein when the referenced setting item is plurally provided, the display part displays on the confirmation screen an image indicating a finish already subjected to processing for the plurality of referenced setting items.

10. The image forming apparatus according to claim 6, wherein the display part displays on the confirmation screen a message indicating the current setting for the referenced setting item.

11. A display method of an image forming apparatus forming an image, the display methods comprising the steps of:
storing a program being a combination of setting items preselected from among setting items of a plurality of functions and preregistered, the program being called to thereby display at the display part a setting screen for making a setting for the preselected and preregistered setting item;
receiving the setting made for the setting item and instructions for starting a job; and
determining a help screen for the setting for the setting item to be displayed,
wherein when the help screen has been displayed in the setting by the called program,
displaying, after receiving the instructions for starting a job, before processing is performed for a referenced setting item as the setting item for which the help screen has been referenced, a confirmation screen for confirming whether or not the processing may be performed at the current setting for the referenced setting item.

12. The display method of the image forming apparatus according to claim 11, further comprising a step of, displaying on the confirmation screen a reset button for making a setting again for the referenced setting item, and then when the reset button has been inputted, displaying the setting screen for the referenced setting item.

13. The display method of the image forming apparatus according to claim 11, further comprising a step of displaying as the confirmation screen at least an image indicating a finish obtained when the processing for the referenced setting item has been performed.

14. The display method of the image forming apparatus according to claim 13, further comprising a step of, when the referenced setting item is plurally provided, displaying on the confirmation screen an image indicating a finish already subjected to processing for the plurality of referenced setting items.

15. The display method of the image forming apparatus according to claim 11, further comprising a step of displaying on the confirmation screen a message indicating a current setting for the referenced setting item.

16. The display method of the image forming apparatus according to claim 11, wherein the program includes a setting item related to post-processing of receiving printed paper on which the formed image is printed and then performing post processing, and
when the referenced setting item is the setting item related to the post-processing, the display method further comprises a step of, after start of the printing, temporarily stopping the image formation before executing the referenced setting item for the post-processing, and while the image formation is temporarily stopped, displaying a confirmation screen for confirming whether or not the processing may be performed at a current setting for the referenced setting item for the post-processing.

17. The display method of the image forming apparatus according to claim 16, further comprising a step of displaying on the confirmation screen a reset button for making a setting again for the referenced setting item, and then when input of the reset button has been received, displaying the setting screen for the referenced setting item.

18. The display method of the image forming apparatus according to claim 16, further comprising a step of displaying as the confirmation screen at least an image indicating a finish obtained when the processing for the referenced setting item has been performed.

19. The display method of the image forming apparatus according to claim 18, further comprising a step of, when the referenced setting item is plurally provided, displaying as the confirmation screen an image indicating a finish already subjected to processing for the plurality of referenced setting items.

20. The display method of the image forming apparatus according to claim 16, further comprising a step of displaying as the confirmation screen a message indicating the current setting for the referenced setting item.

* * * * *